(12) United States Patent
Kawakatsu et al.

(10) Patent No.: US 7,542,165 B2
(45) Date of Patent: Jun. 2, 2009

(54) DYNAMIC IMAGE COMPOSITION APPARATUS AND METHOD

(75) Inventors: Yasuhiro Kawakatsu, Kawasaki (JP); Yuuichirou Ikeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 75 days.

(21) Appl. No.: 11/347,394

(22) Filed: Feb. 6, 2006

(65) Prior Publication Data

US 2006/0187508 A1 Aug. 24, 2006

Related U.S. Application Data

(60) Division of application No. 09/675,049, filed on Sep. 29, 2000, now Pat. No. 7,031,018, which is a continuation of application No. PCT/JP99/01153, filed on Mar. 10, 1999.

(30) Foreign Application Priority Data

Jul. 10, 1998 (JP) ................... 10-195604

(51) Int. Cl.
*G06K 15/00* (2006.01)
*G06K 1/00* (2006.01)

(52) U.S. Cl. .......................... 358/1.3; 358/1.2; 358/1.4; 358/1.5

(58) Field of Classification Search ................. 358/1.13, 358/1.2, 1.4, 1.5, 1.9, 1.18, 1.3; 348/384.1; 382/107; 715/835; 386/111
See application file for complete search history.

(56) References Cited

U.S. PATENT DOCUMENTS

| 5,267,334 | A |  | 11/1993 | Normille et al. |
| 5,596,695 | A |  | 1/1997 | Hamada et al. |
| 5,696,892 | A |  | 12/1997 | Redmann et al. |
| 5,719,947 | A | * | 2/1998 | Enomoto et al. ............ 382/107 |
| 6,014,163 | A |  | 1/2000 | Houskeeper |
| 6,088,480 | A |  | 7/2000 | Sakamoato |
| 6,147,695 | A |  | 11/2000 | Bowen et al. |
| 6,167,562 | A |  | 12/2000 | Kaneko |
| 6,205,287 | B1 | * | 3/2001 | Takahashi et al. ........... 386/111 |
| 6,262,732 | B1 | * | 7/2001 | Coleman et al. ............ 715/835 |
| 6,498,625 | B1 | * | 12/2002 | Yamamoto et al. ....... 348/384.1 |

FOREIGN PATENT DOCUMENTS

| JP | A-63-143676 | 6/1988 |
| JP | A-3-280164 | 12/1991 |
| JP | 5-274419 | 10/1993 |
| JP | 6-096187 | 4/1994 |
| JP | A-07-239947 | 9/1995 |
| JP | 9-167252 | 6/1997 |
| JP | 10-040411 | 2/1998 |
| JP | A-10-40357 | 2/1998 |

OTHER PUBLICATIONS

J.D. Foley, et al., "Computer Graphics: Principles and Practice", Addison-Wesley, 1997, chapters 21.1.4 and 21.2.3.

(Continued)

*Primary Examiner*—Edward L Coles
*Assistant Examiner*—Satwant K Singh
(74) *Attorney, Agent, or Firm*—Staas & Halsey LLP

(57) ABSTRACT

The movement of an image component is determined using the plot information, such as the position, size of the image component, etc., at each time. The complex movement of each image component can be easily generated by providing a plurality of plot information generating units for each image component and combining a plurality of pieces of plot information generated by the plot information generating units when an image is reproduced.

3 Claims, 26 Drawing Sheets

OTHER PUBLICATIONS

Alex Pentland et al., "Good Vibrations: Modal Dynamics for Graphics and Animation", Computer Graphics USA, vol. 23, No. 3, Jul. 3, 1999, pp. 215-222, XP002316956.

Notice of Grounds of Rejection for corresponding Japanese Application No. 2002-206198 dated May 16, 2005.

Notice of Grounds of Rejection for corresponding Japanese Application No. 2002-206198 dated Sep. 27, 2005.

European Office Action mailed Jul. 24, 2006 in corresponding European Patent Application No. 03 012 223.8.

Japanese Office Action mailed on Oct. 17, 2006 and issued in reference to Japanese Patent Application No. 2002-206198, (Partial Translation).

* cited by examiner

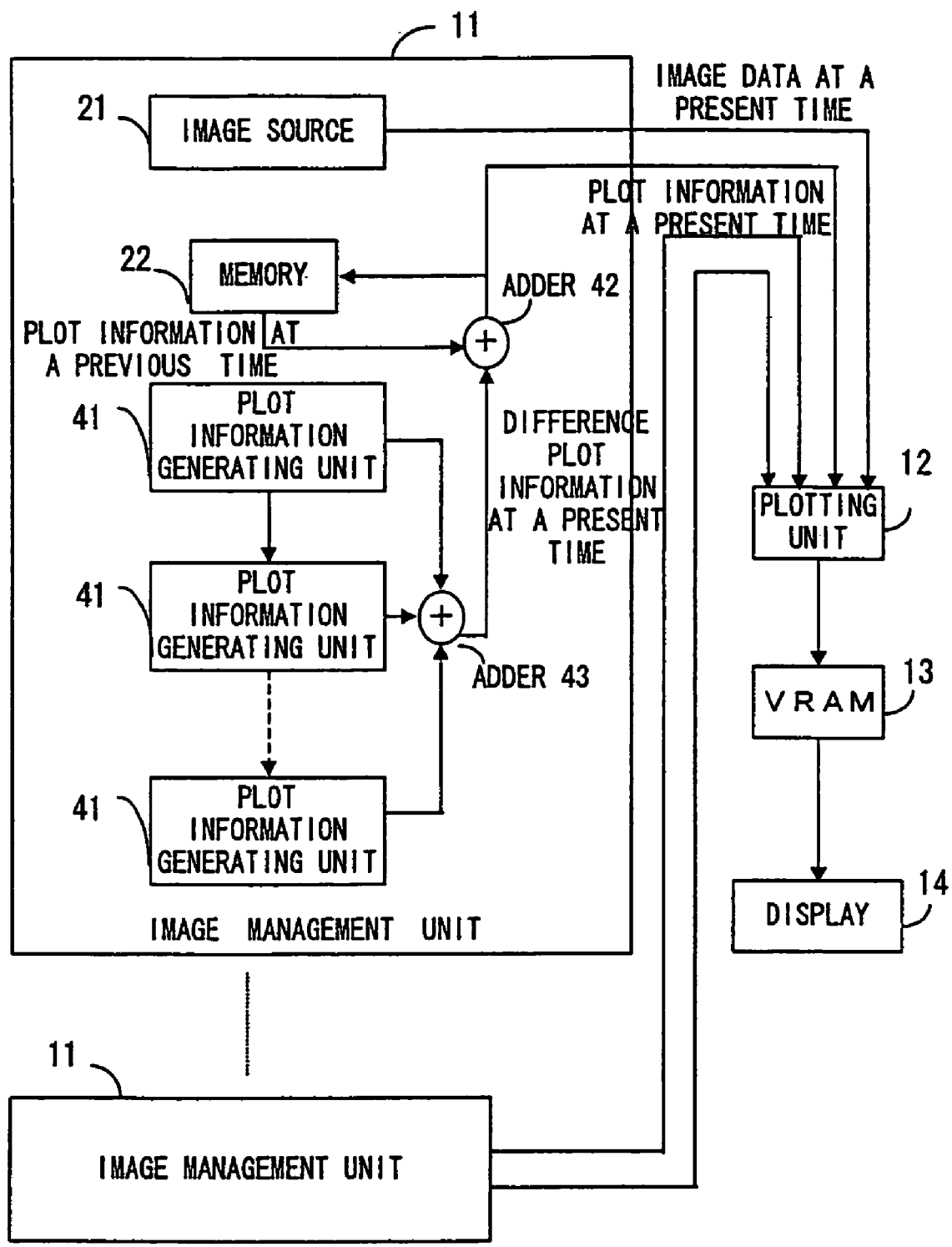
F I G. 4

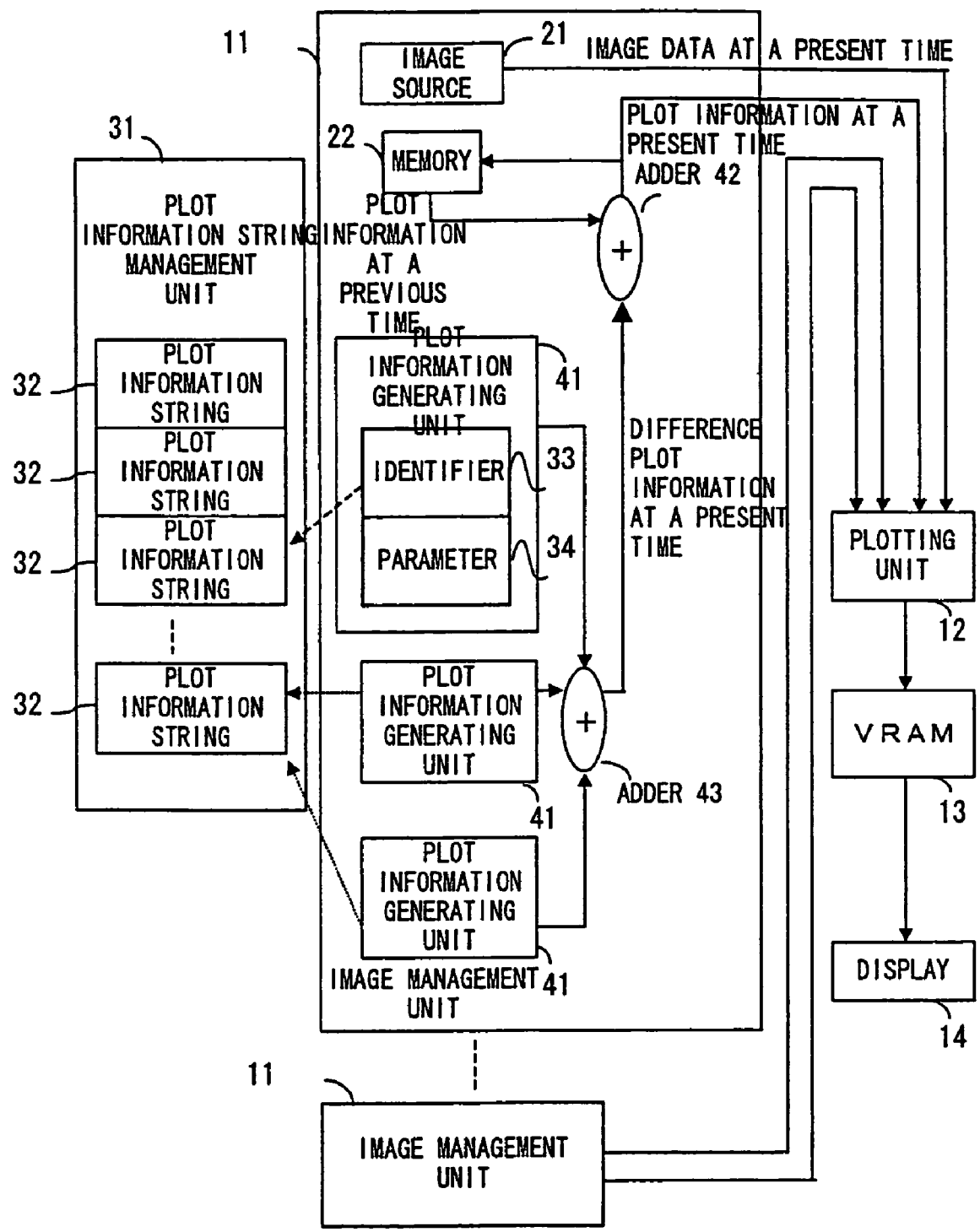
F I G. 5

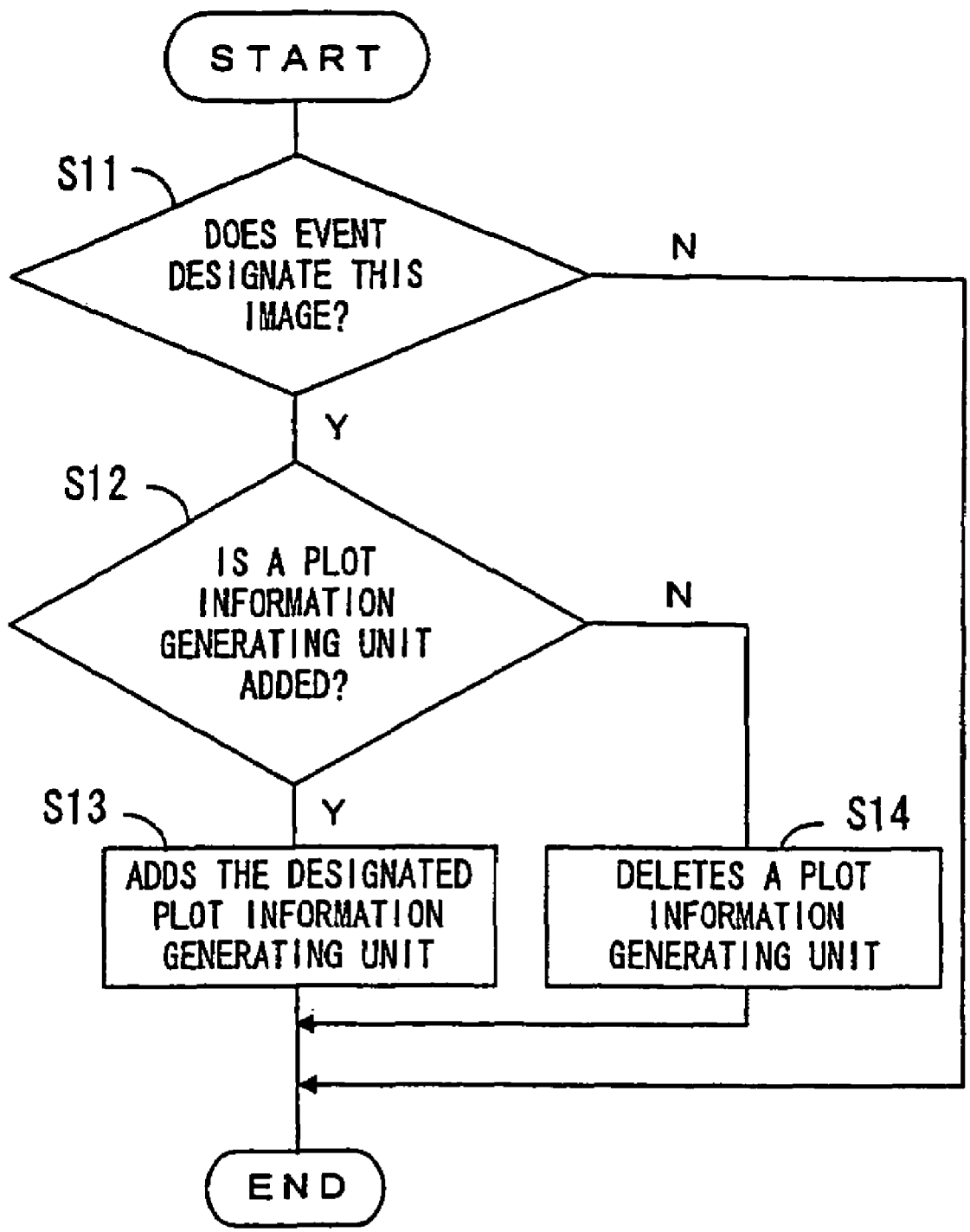
F I G. 8

| TIME | X COORDINATE | Y COORDINATE |
|---|---|---|
| t 1 | x 1 | y 1 |
| t 2 | x 2 | y 2 |
| t 3 | x 3 | y 3 |
| ... | ... | ... |
| t J | x J | y J |

FIG. 13

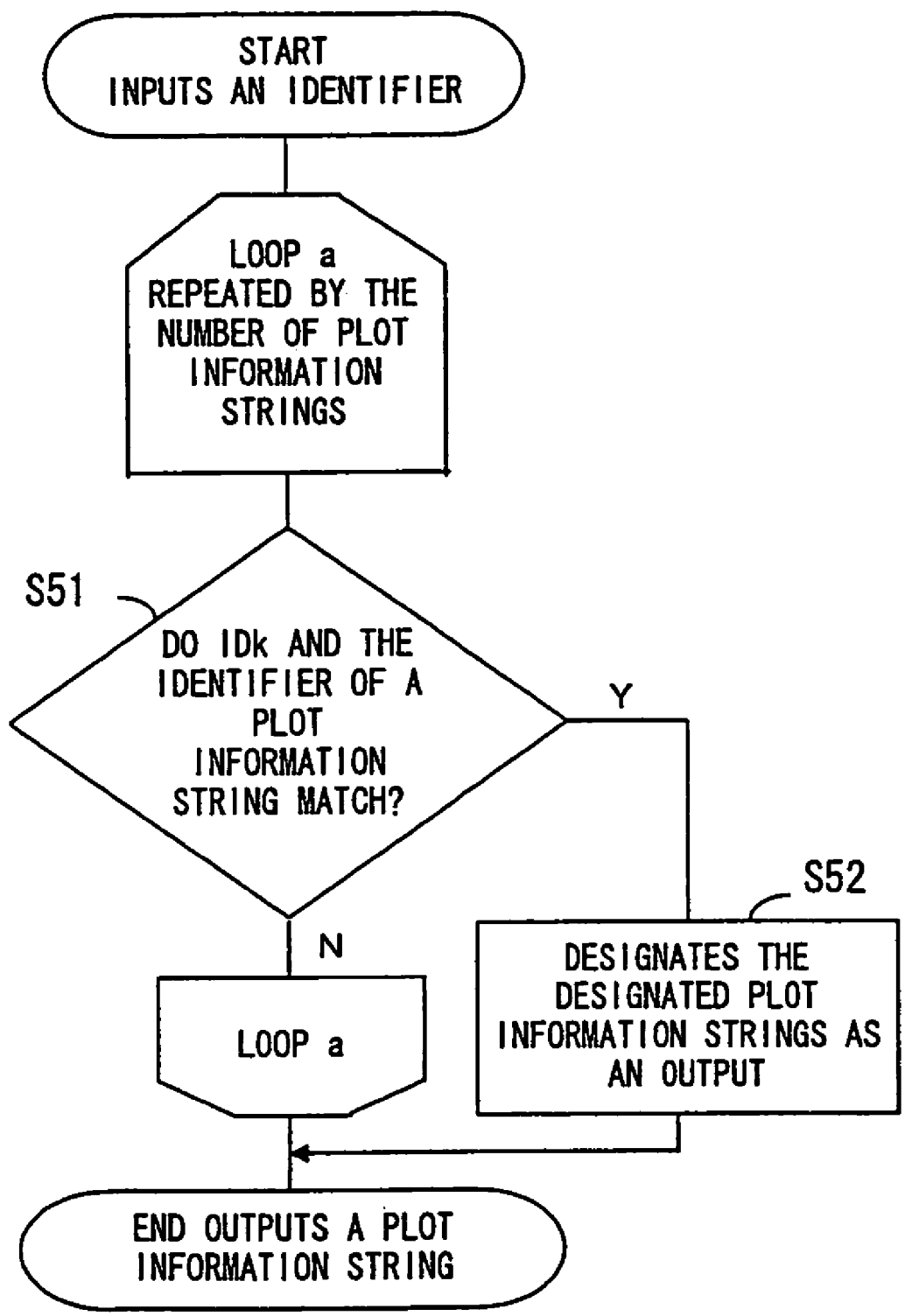
F I G. 1 4

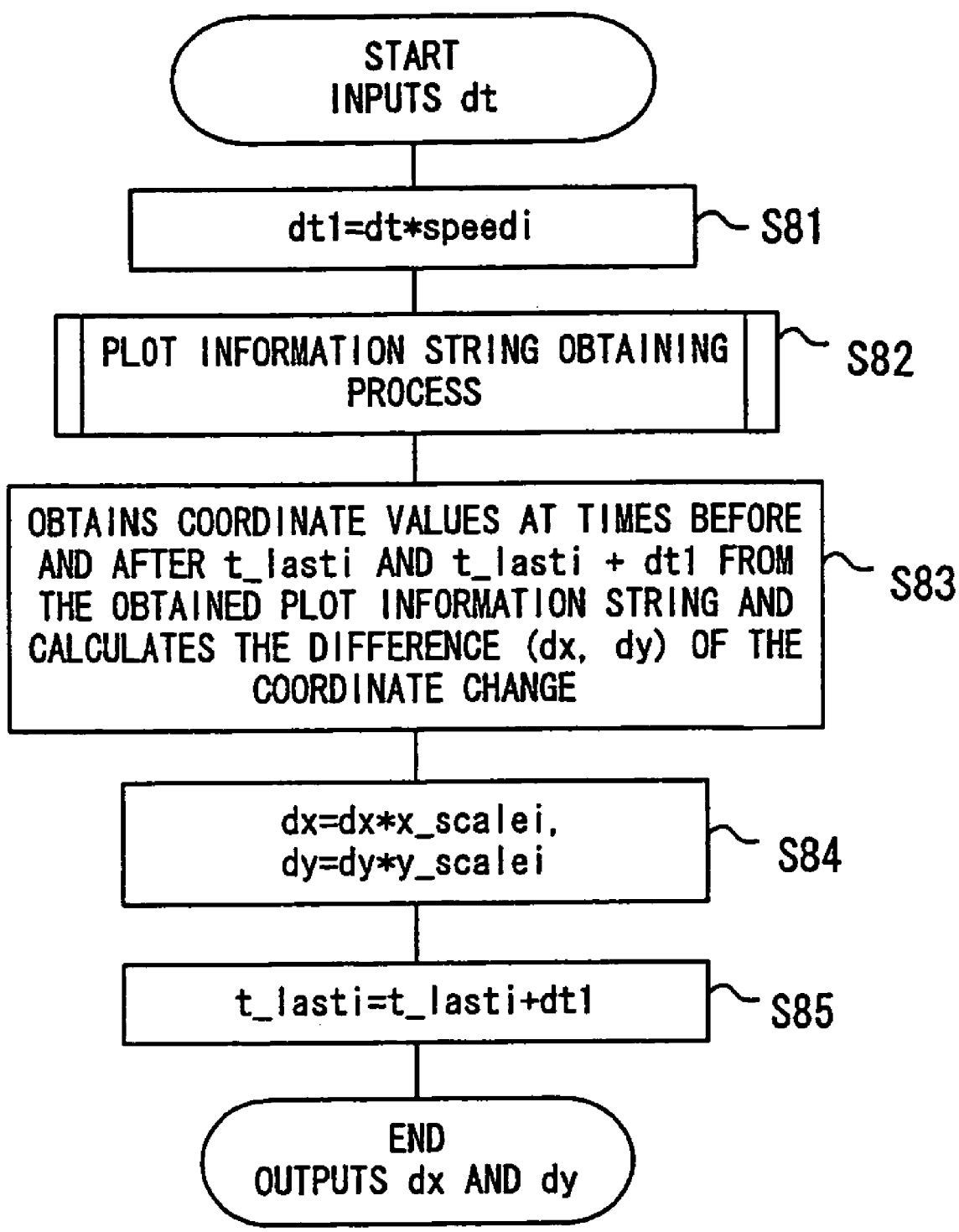
F I G. 1 9

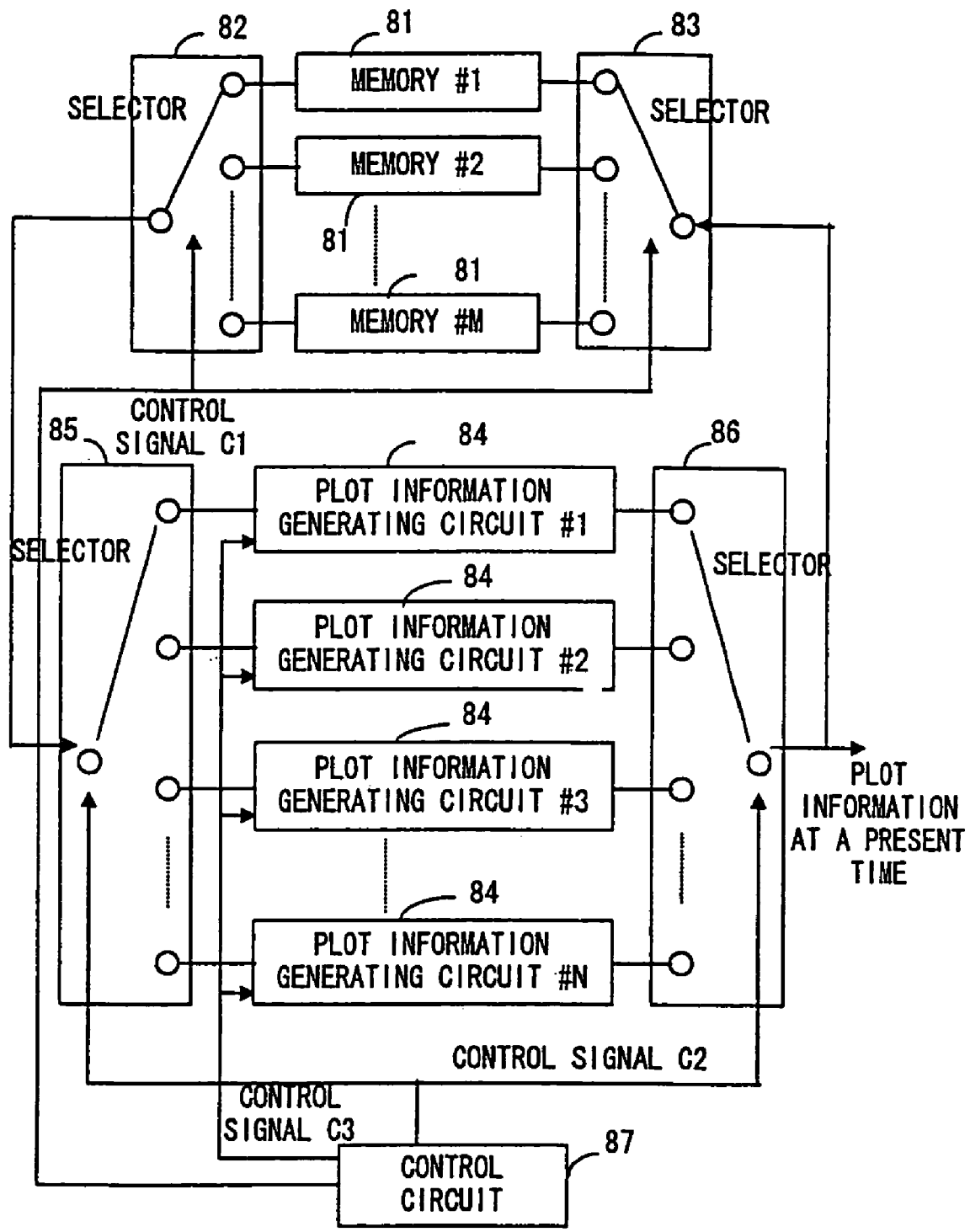
F I G. 2 6

DYNAMIC IMAGE COMPOSITION APPARATUS AND METHOD

CROSS REFERENCE TO RELATED APPLICATION

This application is a divisional of U.S. patent application Ser. No. 09/675,049 filed Sep. 29, 2000, now U.S. Pat. No. 7,031,018, which is also a continuation of International PCT Application No. PCT/JP99/01153 filed on Mar. 10, 1999.

BACKGROUND OF THE INVENTION

1. Field of the Invention

The present invention relates to a dynamic image composition apparatus for combining one or more dynamic images and displaying them on a screen and a method thereof.

2. Description of the Related Art

Recently, with the spread of personal computers and workstations, the number of users who use the reproduction software of dynamic image data to reproduce an image while moving the image on a screen has been increasing. Conventional reproduction software has a function to combine and store both the data of an image component to be displayed and the data of the movement and to transmit the combined data to a plotting device when the image is reproduced.

However, when a complex movement, such as when an image component moves while vertically vibrating, is reproduced, a last movement must be manually composed in advance. Therefore, to represent a plurality of different complex movements when an image is reproduced, all kinds of movements are composed in advance and each image component is displayed according to a respective predetermined movement when the image is reproduced. Even when a plurality of image components are composed of the same movement element, such as translation, etc., each movement must be individually composed.

As described above, in the conventional reproduction software, a great amount of movement data must be prepared to represent many complex movements. A new movement cannot also be composed when an image is reproduced, nor can a movement also be flexibly modified. Furthermore, the conventional reproduction software has a problem that there is no method for sharing the same movement element with a plurality of image components.

SUMMARY OF THE INVENTION

It is an object of the present invention to provide a dynamic image composition apparatus for improving the versatility of each movement element and for easily representing a complex movement when displaying a plurality of dynamic images on a screen and a method thereof.

the dynamic image composition apparatus of the present invention comprises a plurality of plot information generating devices, one or more image management devices and a plotting device, and it combines and displays one or more images.

Each plot information generating device generates plot information used to plot a dynamic image. Each image management device manages the image data of each image and generates the plot information at a present time of each image by combining one or more pieces of plot information generated by one or more of a plurality of plot information generating devices. The plotting device receives both the image data and plot information at a present time from the image management device and plots the image data based on the plot information at a present time.

BRIEF DESCRIPTION OF THE DRAWINGS

FIG. 4 shows the configuration of the third dynamic image composition apparatus;

FIG. 5 shows the configuration of the fourth dynamic image composition apparatus;

FIG. 8 is a flowchart showing an event process;

FIG. 13 shows a plot information string;

FIG. 14 is a flowchart showing a plot information string obtaining process;

FIG. 19 is a flowchart showing the fourth plot information generating process;

FIG. 26 shows the configuration of the fifth dynamic image composition apparatus.

DESCRIPTION OF PREFERRED EMBODIMENTS

The preferred embodiments of the present invention are described in detail below with reference to the drawings.

Figure 1:
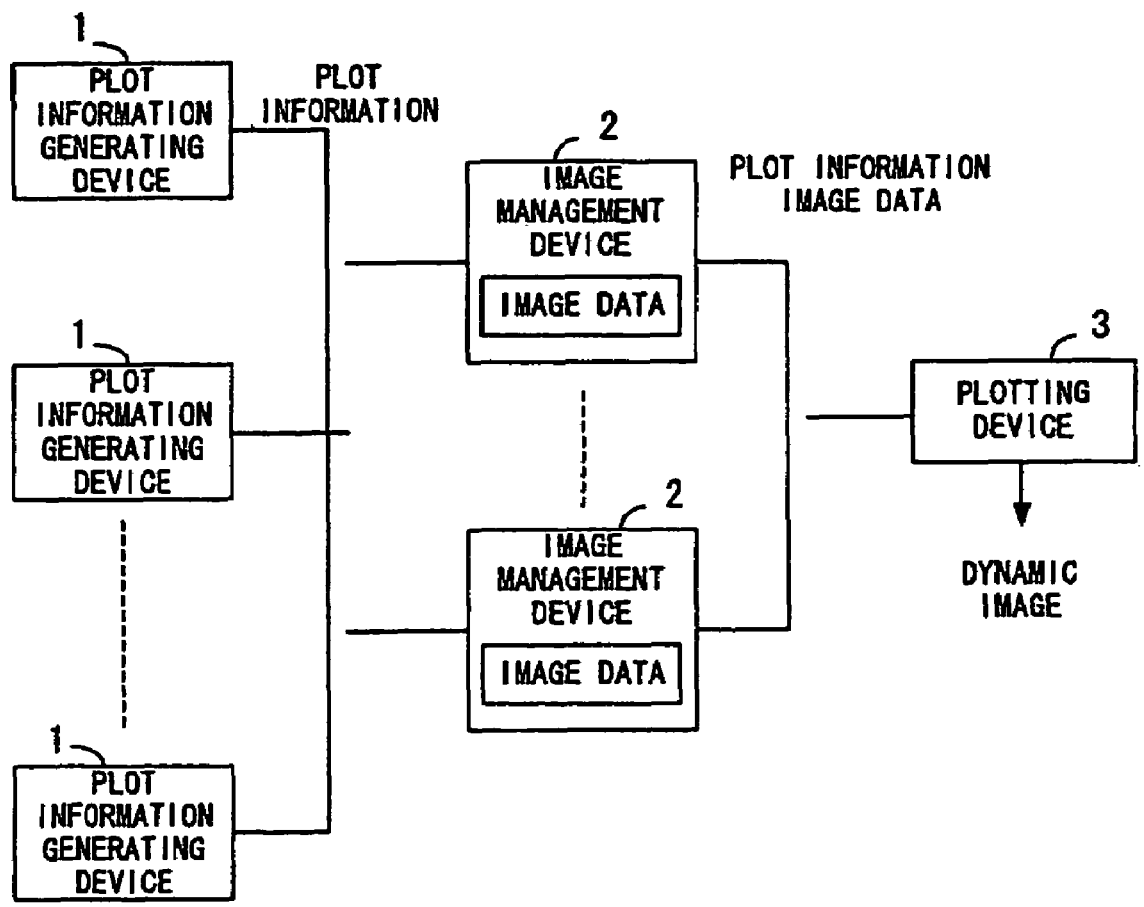
FIG. 1 shows the basic configuration of the dynamic image composition apparatus of the present invention.

FIG. 1 shows the basic configuration of the dynamic image composition apparatus of the present invention. The dynamic image composition apparatus shown in FIG. 1 comprises a plurality of plot information generating devices 1, one or more image management devices 2 and a plotting device 3, and it combines and displays one or more images.

Each plot information generating device 1 generates plot information used to plot a dynamic image. Each image management device 2 manages the image data of each image and generates the plot information at a present time of each image by combining one or more pieces of plot information generated by one or more of a plurality of plot information generating devices 2. The plotting device 3 receives both the image data and plot information at a present time from the image management device 2 and plots the image data based on the plot information at a present time.

The plot information are generated for each image and includes information about the position coordinates on a screen of an image. When an image is reproduced, each of the plurality of plot information generating device 1 generates plot information for plotting a different movement element, and the image management device 2 generates one piece of plot information by combining a plurality of pieces of plot information generated by the plurality of plot information generating devices 1.

For example, if the first and second plot information generating device generate plot information for indicating the vertical vibration of a sine wave and plot information for indicating the rightward shift, respectively, plot information obtained by combining those pieces of plot information indicates a rightward shift with a vertical vibration along the locus of a sine wave.

The plotting device 3 plots image data based on the plot information composed in this way and represents a composed movement. If there are a plurality of image management devices 2, the plotting device 3 plots the image data based on plot information corresponding to each piece of image data and combines a plurality of images on a screen.

In this way, a complex movement can be easily generated by combining a plurality of pieces of plot information generated by a plurality of plot information generating devices 1, in real time when an image is reproduced. Since the plurality of image management devices 2 can use one plot information generating device 1, one movement element can be used to plot a plurality of different images.

Alternatively, a plot information generating device 1 can also be handled as a movement component for plotting an individual movement, and a plot information generating device 1 can also be added/deleted according to an event generated while a dynamic image is reproduced. Therefore, the movement of an image can be modified by a user's input operation, etc.

For example, the plot information generating device 1 shown in FIG. 1 corresponds to the plot information generating unit 23 shown in FIG. 2 and the plot information generating unit 41 shown in FIG. 4, which are both described later. The image management device 2 corresponds to the image management unit 11 shown in FIG. 2. The plotting device 3 corresponds to the plotting unit 12, VRAM (video random access memory) 13 and display 14 which are shown in FIG. 2.

According to the present invention, a plurality of plot information generation units are provided for each image component, and the movement of each image component is composed in real time when an image is reproduced. For plot information, the position, size, rotation angle, color, sequential relationship, etc., of an image component are used, and the movement of each image component can be determined by providing plot information at each time. A complex movement can be easily generated by combining in real time a plurality of pieces of plot information generated by the plurality of plot information generating units. A movement element can be widely used by enabling the same movement element to be referred by a plurality of plot information generating units.

Figure 2:
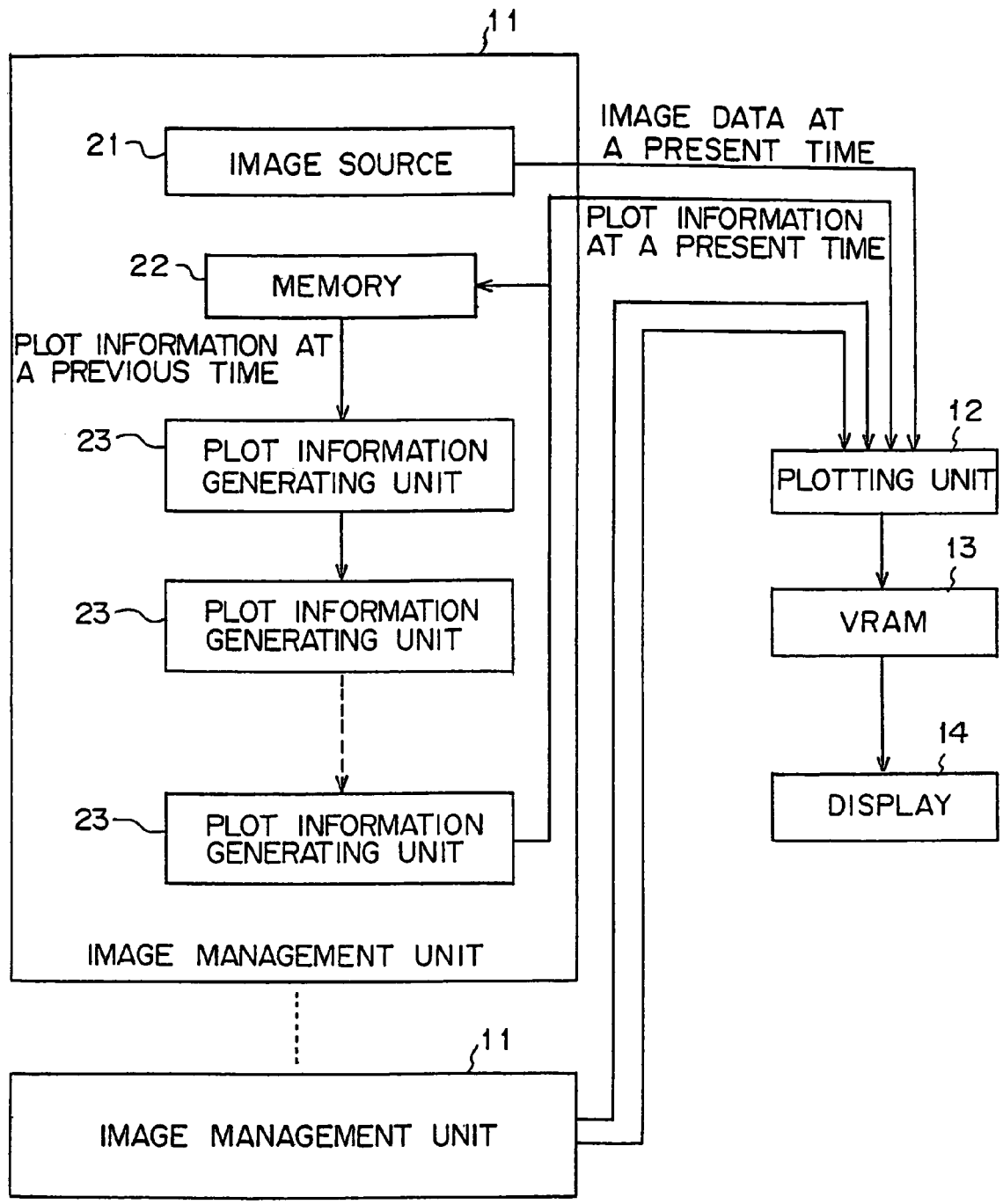
FIG. 2 shows the configuration of the first dynamic image composition apparatus.

FIG. 2 shows the configuration of a dynamic image composition apparatus based on absolute plot information. The dynamic image composition apparatus shown in FIG. 2 comprises one or more image management units 11, a plotting unit 12, a VRAM 13 and a display 14.

The image management unit 11 is provided for each image component, and, for example, it passes both image data and plot information at a present time to the plotting unit 12 at appropriate intervals, such as once per frame, etc., or at dynamically determined intervals. The plotting unit 12 writes the image data, received from each image management unit 11, in the VRAM 13 based on the plot information and displays the data on the screen of the display 14.

The image management unit 11 includes an image source 21, a memory 22 and one or more plot information generating units 23. The image source 21 is, for example, a still image memory, a motion picture image decoder, etc., and it generates image data to be written in the VRAM 13. Therefore, the data in the image source 21 include arbitrary images, such as a still image, motion picture image, character, symbol, etc.

The plot information generating units 23 are linked to one another in an order relation. Each plot information generating unit 23 calculates the absolute plot information at a present time according to a corresponding movement element, adds the calculation result at a present time to the plot information passed by a higher-order plot information generating unit 23 and passes the information to a lower-order plot information generating unit 23.

The highest-order plot information generating unit 23 reads the plot information at a previous time from the memory 22, calculates plot information at a present time based on the information and passes the information to a lower-order plot information generating unit 23. The plot information at a present time outputted by the lowest-order plot information generating unit 23 is passed to the plotting unit 12 and is simultaneously written in the memory 22.

In this case, the order, type and number of the plot information generating units can be fixed or can be dynamically changed according to time, by a user's operation, etc. The plot information generating unit 23 can be configured by software or hardware.

Figure 3:
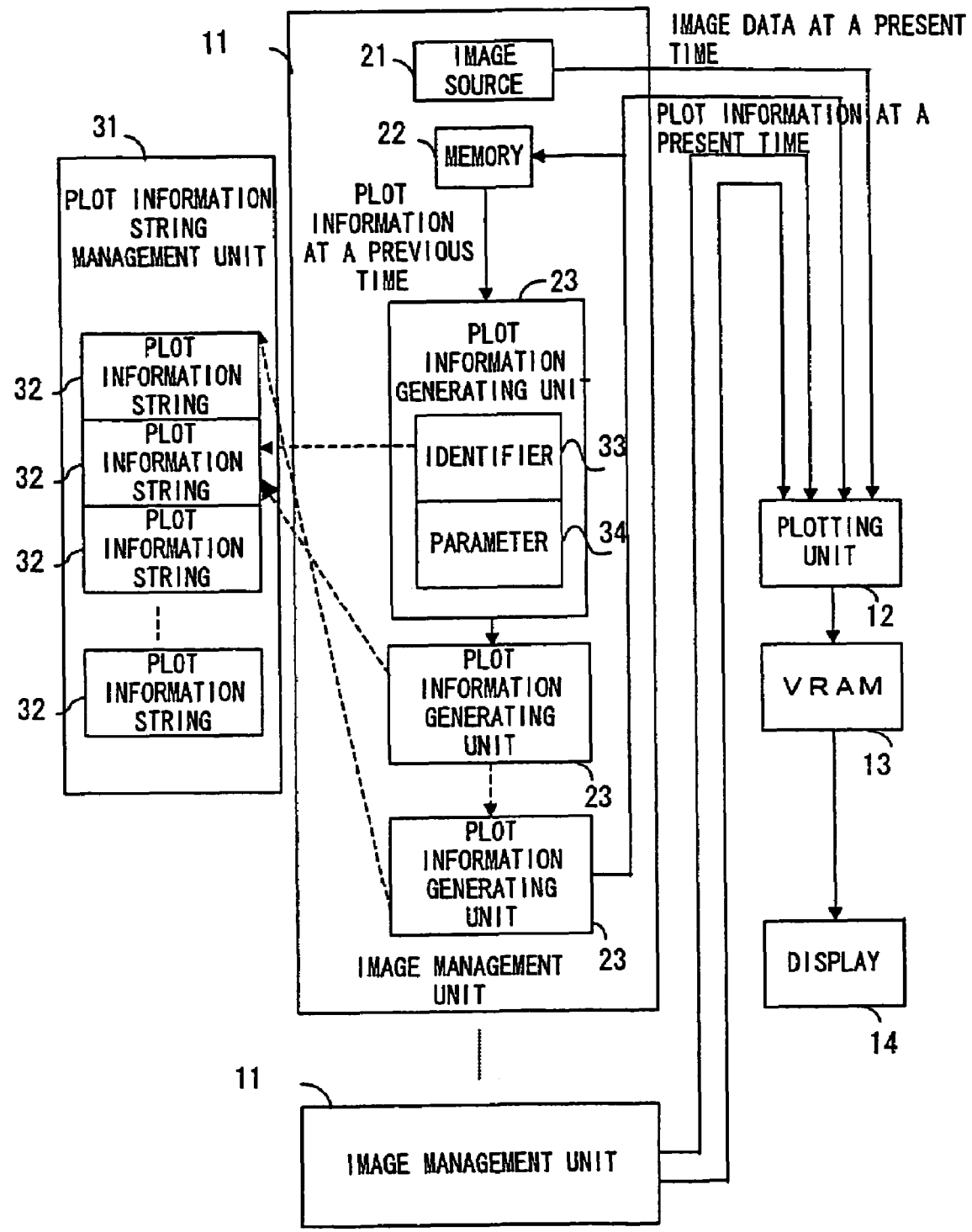
FIG. 3 shows the configuration of the second dynamic image composition apparatus.

The dynamic image composition apparatus shown in FIG. 2 can be implemented, for example, by the configuration shown in FIG. 3. The dynamic image composition apparatus shown in FIG. 3 further comprises a plot information string management unit 31 in addition to the constituent components shown in FIG. 2.

The plot information string management unit 31 stores one or more plot information strings 32, and these plot information strings 32 are identified by identifiers (indexes). The plot information string 32 is a list of a plurality of pieces of plot information at arbitrarily discrete times, and it describes respective pieces of plot information at each time of, for example, 0, 10, 60 and 65 seconds.

Each plot information generating unit 23 stores both an identifier 33 for referring to the plot information string 32 and a modification parameter 34 for modifying plot information. At a specific time, the plot information generating unit 23 extracts two pieces of plot information before and after the time from the plot information string 32 in the plot information string management unit 31 corresponding to the identifier 33. Then, the plot information generating unit 23 calculates plot information at a present time by a method of performing interpolation using the extracted plot information, etc.

Then, the plot information generating unit 23 enlarges or reduces the calculated plot information by the parameter 34, adds the calculation result at a present time to the plot information passed by a higher-order plot information generating unit 23 and passes the information to a lower-order plot information generating unit 23. The parameter 34 can be not only applied to plot information itself, but it can also be applied to a time when the plot information is extracted. By changing a time in this way, the movement speed of an image can be changed.

FIG. 4 shows a dynamic image composition apparatus based on the difference between two pieces of plot information. The dynamic image composition apparatus shown in FIG. 4 comprises one or more image management units 11, a plotting unit 12, a VRAM 13 and a display 14 like the dynamic image composition apparatus shown in FIG. 2.

The image management unit 11 includes an image source 21, a memory 22, one or more plot information generating units 41 and adders 42 and 43. Each plot information generating unit 41 calculates the difference in plot information (difference plot information) between a previous time and a present time according to a corresponding movement element, and adds the difference to the adder 43.

The adder 43 totals a plurality of pieces of the difference plot information at a present time outputted by the plot information generating units 41, and the adder 42 obtains plot information at a present time by adding the totaled difference plot information at a present time to plot information at a previous time read from the memory 22. The plot information at a present time outputted from the adder 42 is passed to the plotting unit 12 and is simultaneously stored in the memory 22.

In this case, the type and number of the plot information generating units 41 can be fixed or can be dynamically changed according to time, by a user's operation, etc. The operational order of the plot information generating units 41 does not have to be specially designated and they can also be operated in parallel. The plot information generating units 41 can be configured by software or hardware.

The dynamic image composition apparatus shown in FIG. 4 can be implemented, for example, by a configuration, as shown in FIG. 5.

The dynamic image composition apparatus shown in FIG. 5 further comprises the plot information string management unit 31 shown in FIG. 3 in addition to the constituent components shown in FIG. 4.

Each plot information generating unit 41 stores both an identifier 33 for referring to the plot information string 32 and a modification parameter 34 for modifying plot information like the plot information generating unit 23 shown in FIG. 3. The plot information generating unit 41 calculates difference plot information at a present time by a method of performing interpolation based on the plot information extracted from the plot information string management unit 31 using the identifier 33, etc. Then, the plot information generating unit 41 enlarges or reduces the calculated difference plot information by the parameter 34 and outputs the calculation result to the adder 43.

Next, the operation of the dynamic image composition apparatus described above is described in detail. Here, a plot process in the case where the image management unit 11 and plotting unit 12 are configured by reproduction software is mainly described.

It is assumed that the data of the image source 21, the data of the plot information string management unit 31, the programs of the plot information generating units 23 and 41, the program of the plotting unit 12, etc., are already read and expanded in the memory of a computer. For example, if the image source 21 is an MPEG (Moving Picture Experts Group) decoder, motion picture data after image expansion are read into the memory.

The plotting unit 12 stores a variable in order to receive an event notice from another event control unit, such as an event loop, etc. For the event, an arbitrary form, such as a user's input operation, interruption by the system, etc., and the event is not limited to a specific form.

Although for the plot update interval, a specific value dt is used, the same fundamental algorithm can be applied even if an update interval is dynamically changed depending on the function of reproduction hardware, etc. Generally, the longer the update interval, the smaller the plotting frequency and the higher the plotting speed. Therefore, a real time process can be implemented by appropriately adjusting an update interval.

Although for plot information, two-dimensional coordinates corresponding to the position at which an image is displayed are used, the same fundamental algorithm can also be applied, even if other plot information, such as the size, rotation angle, etc., of an image is used.

Although for the data included in the plot information string 32, an identifier, time and two-dimensional coordinate string are used, the overall algorithm does not change, even if information indicating a more complex movement is included. Since the plot information generating units 23 and 41 store respective unique internal times and coordinate spaces, different movements can be represented by one plot information string 32.

Figure 6:
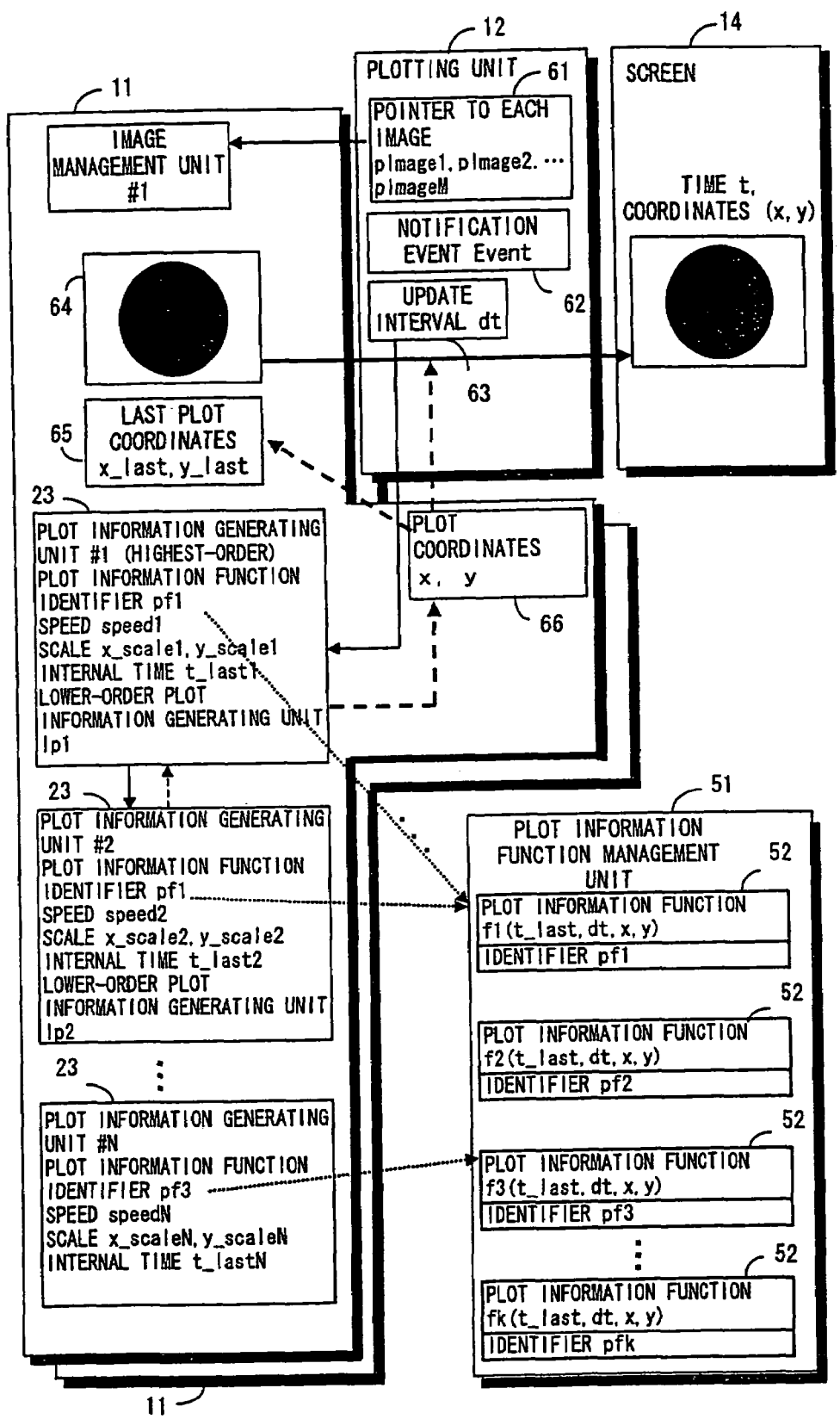
FIG. 6 shows the first dynamic image composition.

FIG. 6 shows a dynamic image composition process in the case where a plot information function is used instead of the plot information string 32 in the configuration shown in FIG. 3. The plot information function management unit 51 shown in FIG. 6 stores one or more plot information functions 52 in the form of a list, and these plot information functions 52 can be identified by identifiers.

The plotting unit 12 stores a list 61 of pointers to an arbitrary number of image management units 11, a variable 62 for receiving an event notice and an image update interval 63. A pointer pImagei (i=1,2, . . . ,M) included in the list 61 indicates an image management unit #i.

Each image management unit 11 stores the data 64 of the image source 21, the most recent plot coordinates 65 at a previous time corresponding to the memory 22, the plot coordinates 66 and the highest-order image information generating unit #1, and the plot information generating unit #i (i=1, 2, . . . ,N−1) stores pointer Ipi to a lower-order plot information generating unit #(i+1). However, the lowest-order plot information generating unit #N stores no pointer to another plot information generating unit 23.

Each plot information generating unit #i (i=1,2, . . . ,N) stores a plot information function identifier pfk (k=1,2, . . . , K), a speed parameter speedi, scale parameters x_scalei and y_scalei and an internal time t_lasti.

Since the identifier pfk corresponds to the plot information function 52 of the plot information function management unit 51, each plot information generating unit 23 can refer to an arbitrary information function 52. Therefore, one plot information function 52 can sometimes be referred by a plurality of plot information generating units 23 in one image management unit 11 and can sometimes be referred by the respective plot information generating units 23 in a plurality of image management units 11.

Figure 7:
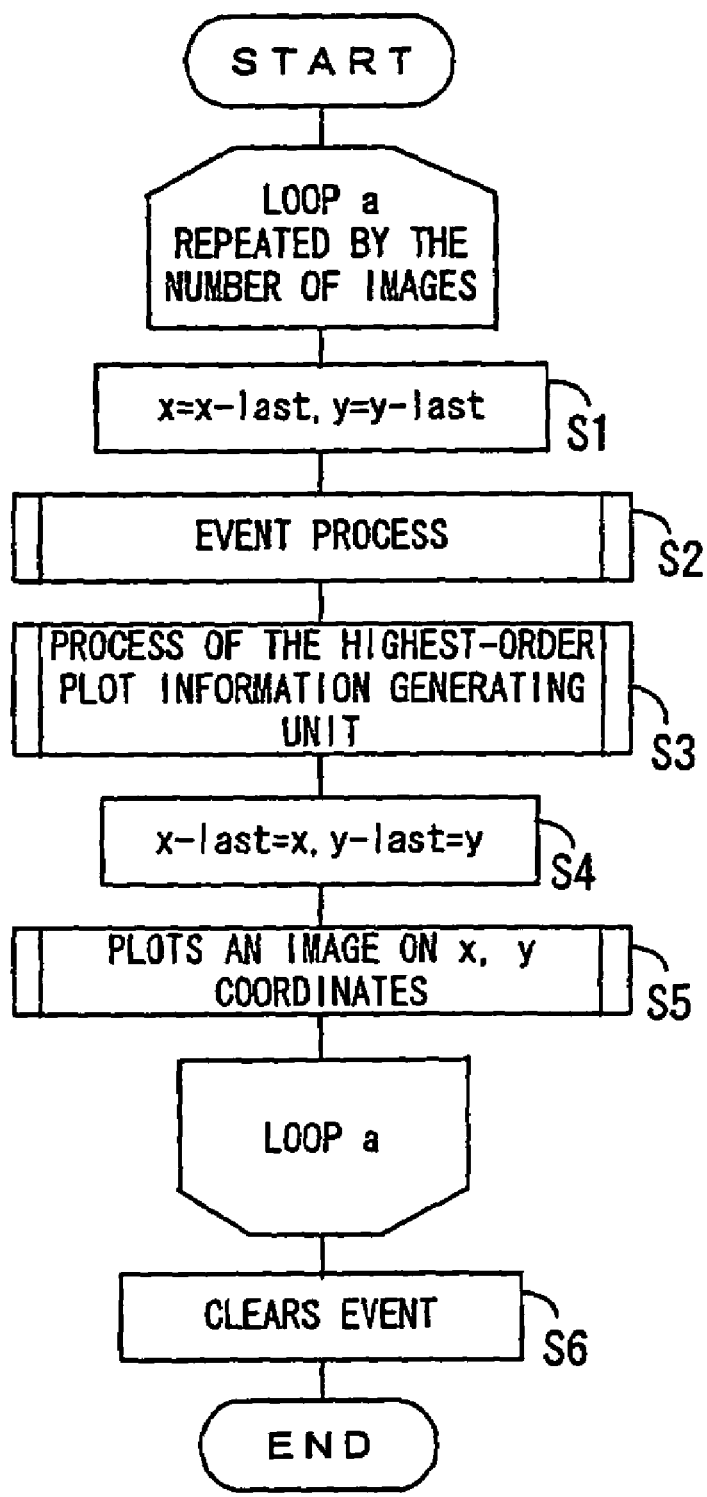
FIG. 7 is a flowchart showing the first plot update process.

FIG. 7 is a flowchart showing the plot update process of the dynamic image composition apparatus shown in FIG. 6. M pieces of image data 64 of image management units #1-#M are sequentially plotted on coordinates generated via plot information generating units #1-#N by one plot update process. A loop a corresponds to a process of calling up each plot management unit 11 and the process is repeated M times.

At loop a, the image management unit 11 assigns the last plot coordinates (x_last, y_last) at a previous time to plot coordinates (x, y) (step S1) and it performs an event process (step S2). In the event process, event information which is notified to the plotting unit 12 during an update interval dt and stored in a variable Event, is identified and the plot information generating units 23 are dynamically reorganized, if required. The details of this event process are described later.

Then, the highest-order plot information generating unit #1 is called up and the change of the plot coordinates during the update interval dt is calculated (step S3). At this time, if there are lower-order plot information generating units 23, the units are recurrently called up and plot coordinates (x, y) outputted by the lowest-order plot information generating unit #N are passed to the plotting unit 12 as plot coordinates at a present time. The details of this plot information generating process are described later.

Then, the image management unit 11 assigns the obtained coordinates (x, y) to coordinates (x_last, y_last) (step S4), and the plotting unit 12 plots the image data 64 at the position of the coordinates (x, y) (step S5).

When the loop a processes of all image management units 11 are completed, the plotting unit 12 clears the variable Event in order to receive a new event notice (step S6) and terminates the process.

FIG. 8 is a flowchart showing the event process in step S2 shown in FIG. 7. The event information stored in the variable Event of the plotting unit 12 includes both the identifier of the image data 64 and a flag indicating that a new plot information generating unit 23 should be generated or that an existing plot information generating unit 23 should be deleted. The event information also includes additional information for designating a plot information generating unit 23 to be generated/deleted.

On receipt of the event information from the plotting unit 12, the image management unit 11 judges from the identifier whether the image data 64 being processed are the target of the event notice (step S11). If the image data 64 being processed are not the target, the image management unit 11 terminates the process. If the image data are the target, the image management unit 11 adds/deletes a plot information generating unit 23 using both the flag and additional information.

Here, the image management unit 11 judges whether the flag indicates the addition of a plot information generating unit (step S12). If it is judged that the flag indicates the addition, the image management unit 11 adds a plot information generating unit 23 designated by the additional information (step S13) and terminates the process. If it is judged that the flag does not indicates the addition, the image management unit 11 deletes a plot information generating unit 23 designated by the additional information (step S14) and terminates the process.

The addition/deletion of a plot information generating unit 23 can be implemented, for example, by adding data to the list of plot information generating units 23 stored by the image management unit 11 and deleting data from the list. At this time, pointers between plot information generating units 23 are reorganized, if required.

The complex movement of an image can be dynamically changed by such a dynamic reorganization process of plot information generating units 23. For example, by deleting a plot information generating unit 23 only for a single vibration or only for a parallel shift from the image management unit 11 for an image which is obtained by combining the single vibration and parallel shift and which moves in the form of a sine wave, the present movement of the image can be transferred to another simpler movement. By adding a plot information generating unit 23 for single vibration to the image management unit 11 of an image which moves in parallel, the present movement of the image can be transferred to another more complex movement.

Figure 9:
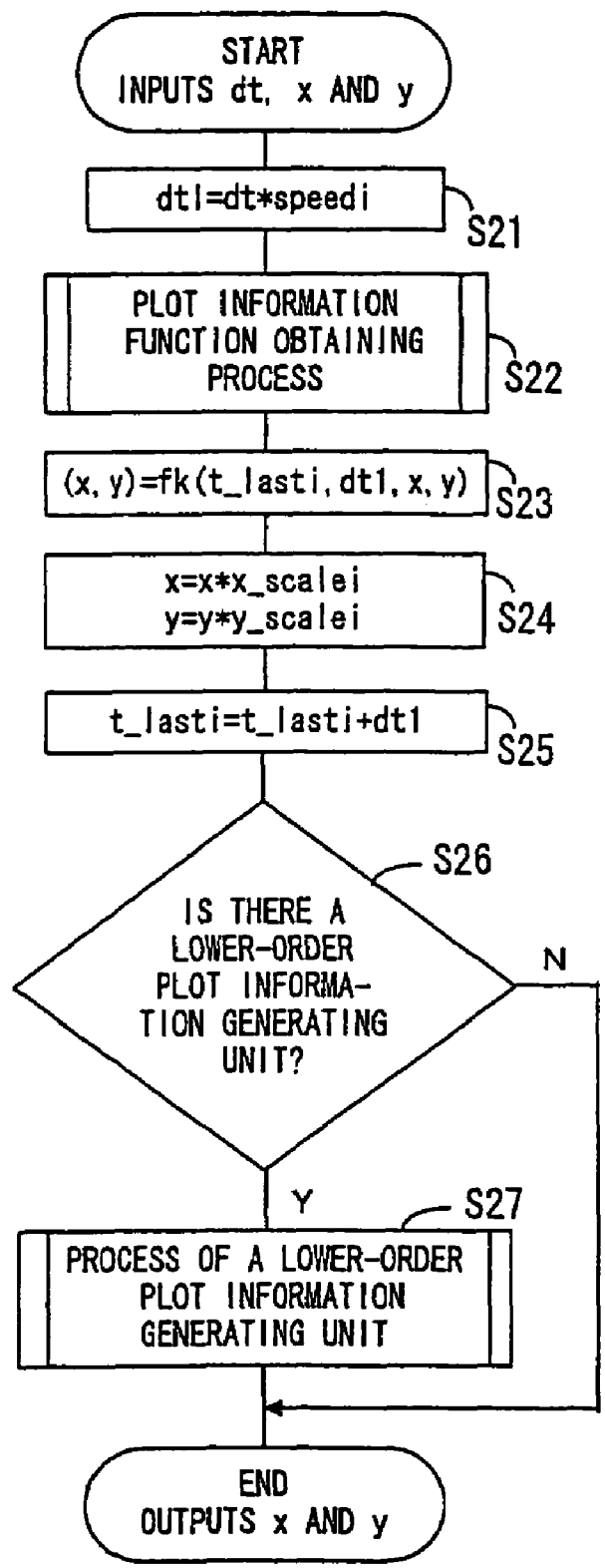
FIG. 9 is a flowchart showing the first plot information generating process.

FIG. 9 is a flowchart showing the plot information generating process in step S3 shown in FIG. 7. The highest-order plot information generating unit #1 executes a process using both an update interval dt and plot coordinates (x, y) as inputs, and outputs updated plot coordinates (x, y).

The plot information generating unit #1 first multiplies the update interval dt by a parameter speed1 to convert a global update interval dt to the internal update interval dt1 of the plot information generating unit #1 (step S21).

Then, the plot information generating unit #1 obtains a plot information function f1(t_last, dt, x, y) corresponding to a plot information function identifier pf1 from the plot information function management unit 51 (step S22). This plot information function obtaining process is described later. Then, the plot information generating unit #1 calculates new plot coordinates (x, y) according to the following equation using an internal time t_last1 calculated at a previous time, the internal update interval dt1 and the inputted plot coordinates (x, y) (step S23).

$$(x, y) = f1(t\_last1, dt1, x, y) \tag{1}$$

Equation (1) indicates that x and y are calculated as functions of t_last1, dt1, x and y. For f1(t_last1, dt1, x, y), for example, a function in which x=0, y=sin(t_last1+dt1), is used.

Then, in order to convert the obtained plot coordinates (x, y) from the internal coordinate space to a global coordinate space, x and y are multiplied by a parameter x_scale1 and y_scale1, respectively, and the results are assigned to x and y, respectively (step S24).

Then, the plot information generating unit #1 updates the internal time by assigning t_last1=t_last1+dt1 (step S25) and judges whether there is a lower-order plot information generating unit 23 (step S26). In this case, if there is a pointer 1p1 to the lower-order information generating unit 23, it is judged that there is a lower-order plot information generating unit 23. If there is no lower-order plot information generating unit 23, the plot coordinates (x, y) are outputted as the result of one update process.

If there is a lower-order plot information generating unit 23, the plot information generating unit #1 calls up the lower-order plot information generating unit 23, provides the lower-order plot information generating unit 23 with both the update interval dt and obtained plot coordinates (x, y) as inputs and makes the lower-order plot information generating unit 23 execute the same plot information generating process (step S27). In this case, the plot information generating process shown in FIG. 9 is recurrently called up and the process of a plot information generating unit #i is executed.

At this time, the plot information generating unit #i calculates dt1=dt*speedi in step S21, obtains a plot information function fk(t_last, dt, x, y) corresponding to the identifier pfk in step S22 and calculates the plot coordinates (x, y) according to the following equation in step S23.

$$(x, y) = fk(t\_lasti, dt1, x, y) \tag{2}$$

The plot information generating unit #i calculates x=x*x_scalei and y=y*y_scalei in step S24, calculates t_lasti=t_lasti+dt1 in step S25 and judges whether there is a pointer 1pi in step S26.

If in step S26 there is a lower-order plot information generating unit 23, the plot information generating unit #i calls up the lower-order plot information generating unit 23. If there is no lower-order plot information generating unit 23, the plot information generating unit #i outputs the obtained plot coordinates (x, y) to the original higher-order plot information generating unit 23 and terminates the process.

On receipt of the plot coordinates from the lower-order plot information generating unit 23, the higher-order plot information generating unit 23 sequentially passes the plot coordinates to other higher-order plot information generating units 23 and the highest plot information generating unit #1 outputs the received plot coordinates as the result of one update process.

By such a plot information generating process, a plurality of plot information generated by a plurality of pieces of plot information generating units 23 can be combined in real time and they can be supplied to the plotting unit 12. Therefore, the complex movement of an image can be easily generated by automatically repeating the update of the image.

Figure 10:
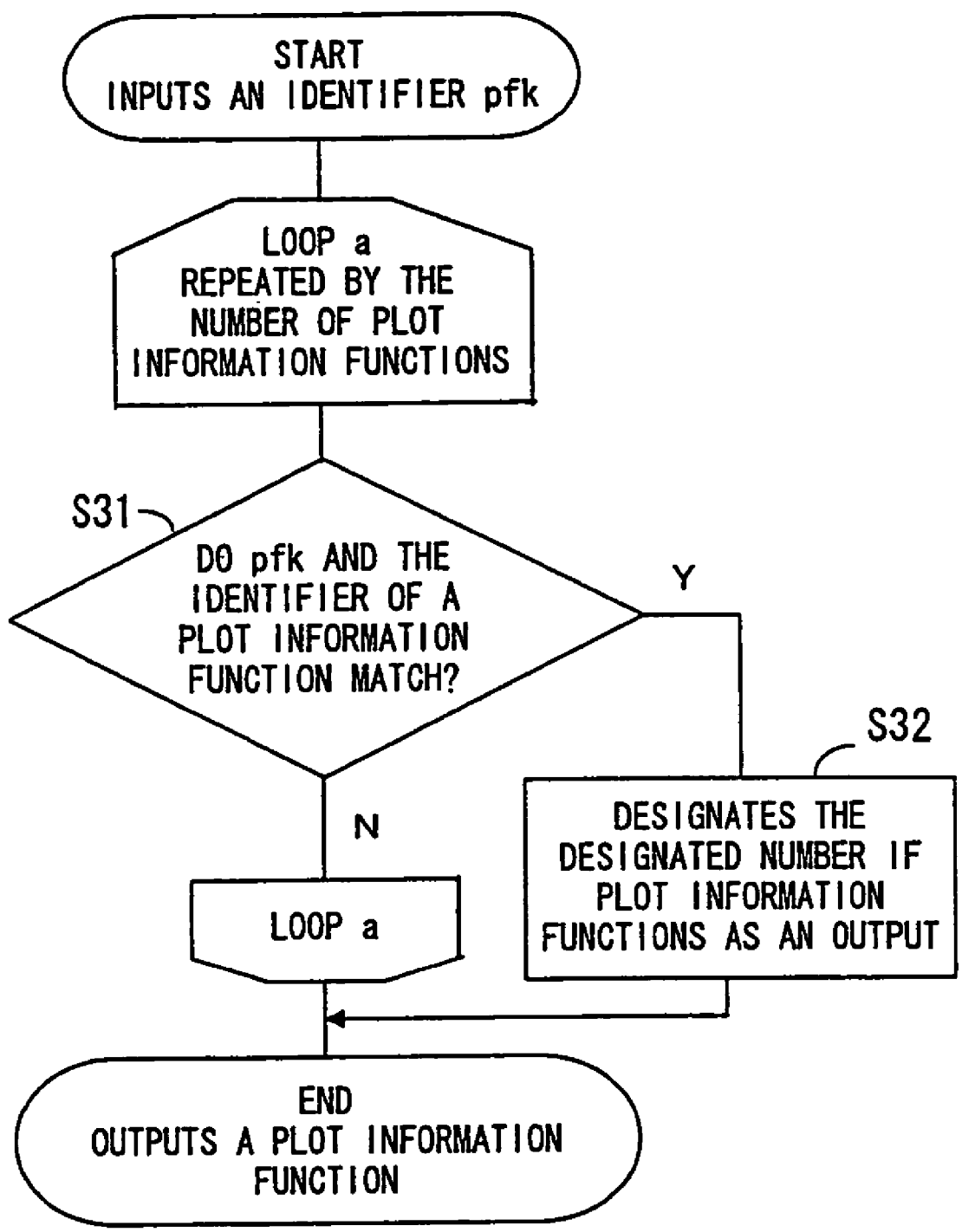
FIG. 10 is a flowchart showing a plot information function obtaining process.

FIG. 10 is a flowchart showing the plot information function obtaining process in step S22 shown in FIG. 9. When the plot information generating unit #i passes the identifier pfk to the plot information function management unit 51, the plot information function management unit 51 executes the loop a process. Loop a is repeated K times in correspondence with the number of plot information functions.

In loop a, the plot information function management unit 51 compares the inputted identifier pfk with the identifier of one plot information function 52 (step S31). If the identifiers match, the plot information function management unit 51 outputs a plot information function 52 corresponding to the identifier pfk (step S32) and terminates the process. If the identifiers do not match, the plot information function management unit 51 repeats a process of comparing the identifier pfk with the identifier of a subsequent plot information function 52.

Figure 11:
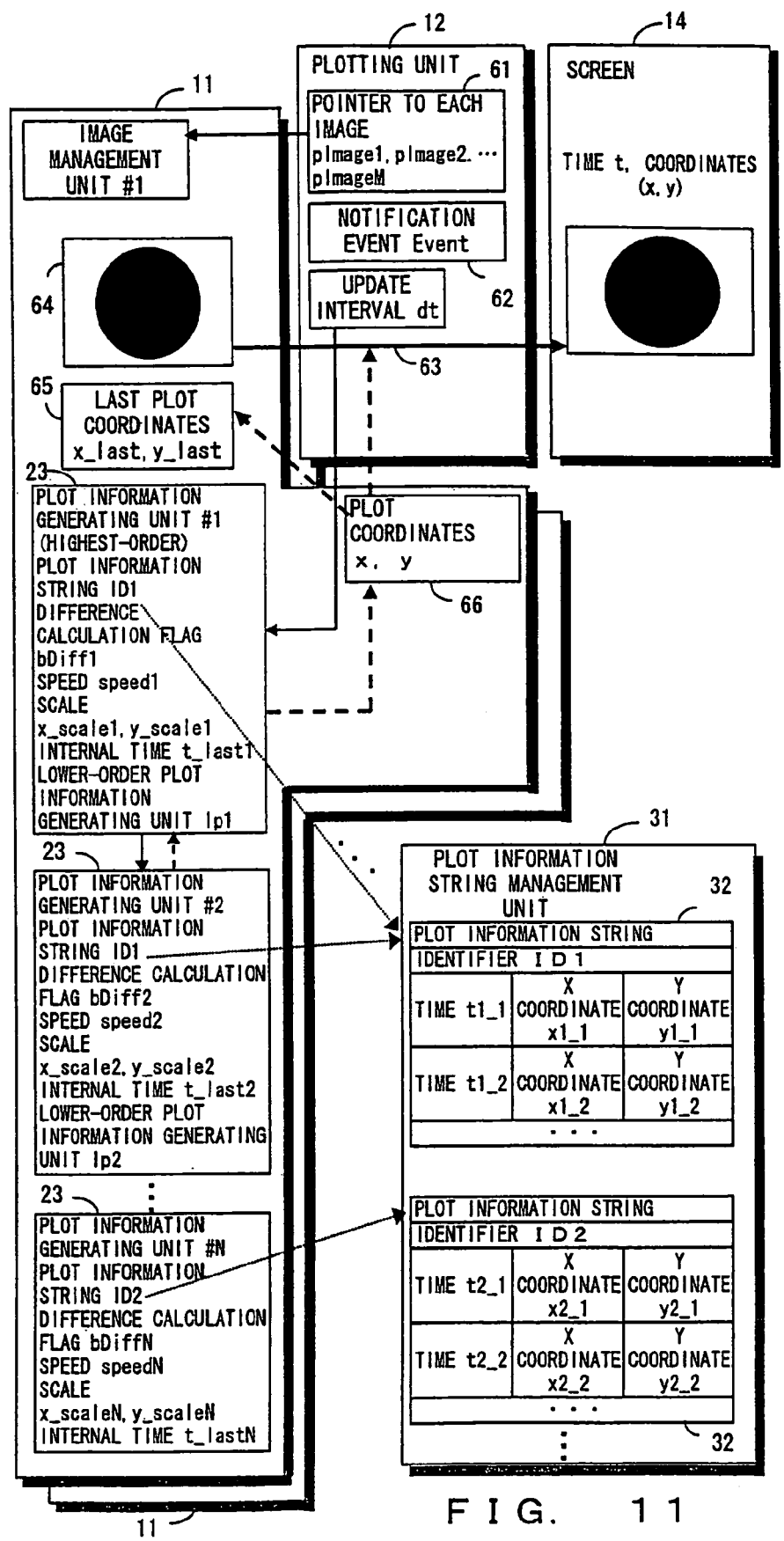
FIG. 11 shows the second dynamic image composition.

FIG. 11 shows a dynamic image composition process in the case where the configuration shown in FIG. 3 is used. The plot information string management unit 31 shown in FIG. 11 stores one or more plot information strings 32 in the form of a list, and these plot information strings 32 are identified by identifiers. Each plot information string 32 includes a string of discrete times and plot coordinate values.

The list 61, event variable 62 and update interval 63 of the plotting unit 12, and the image data 64, last plot coordinates 65 and plot coordinates 66 of the image management unit 11 are the same as those shown in FIG. 6. Each plot information generating unit #i (i=1,2, . . . ,N) stores an information string identifier IDk (k=1,2, . . . ,K) instead of the plot information function identifier shown in FIG. 6.

Since the identifier IDk corresponds to the plot information string 32 of the plot information string management unit 31, each plot information generating unit 23 can refer to an arbitrary plot information string 32. Therefore, one plot information string 32 can sometimes be referred by a plurality of plot information generating units 23 in one image management unit 11 and can sometimes be referred by the respective plot information generating units 23 in a plurality of image management units 11.

The plot information generating unit #i stores a difference calculation flag bDiffi as one of the parameters. The plot information generating unit #i adds a difference to inputted plot coordinates and outputs the coordinates if this bDiffi value is true, and it outputs absolute plot coordinates regardless of inputted plot coordinates if the bDiffi value is false.

The plot update process of the dynamic image composition apparatus shown in FIG. 11 is basically the same as that shown in FIG. 7. However, in step S3 shown in FIG. 7, the highest-order plot information generating unit #1 executes the plot information generating process shown in FIG. 12 using both an update interval dt and plot coordinates (x, y) as inputs and it outputs the updated plot coordinates (x, y).

The plot information generating unit #1 first converts the update interval dt to an internal update interval dt1 by multiplying the update interval dt by a parameter speed1 (step S41) and obtains a plot information string corresponding to a plot information string identifier ID1 (step S42). This plot information string obtaining process is described later.

Then, the plot information generating unit #1 obtains coordinate values at times before and after t_last1 and t_last1+dt1, and calculates the coordinate change difference (dx, dy) between t_last1 and t_last1+dt1 by interpolation using those coordinate values (step S43). This difference (dx, dy) corresponds to the movement amount of an image during the internal update interval dt1.

For example, if the plot information string shown in FIG. 13 is obtained, the difference (dx, dy) is calculated as follows. However, it is assumed that t1<t2<t3< . . . <tJ is satisfied, x1, x2, x3, . . . , xJ are different and y1, y2, y3, . . . , yJ are different.

First, in the case of t1<t_last1<t_last1+dt1<t2, the difference (dx, dy) is calculated according to the following equations.

$$dx=(x2-x1)*dt1/(t2-t1)$$

$$dy=(y2-y1)*dt1/(t2-t1) \quad (3)$$

In the case of t1<t_last1<t2< . . . <tj<t_last1+dt1<t(j+1), the difference (dx, dy) is calculated according to the following equations.

$$dx=(x2-x1)*(t2-t\_last1)/(t2-t1)+xj-x2+(x(j+1)-xj)*(t\_last1+dt1-tj)/(t(j+1)-tj)$$

$$dy=(y2-y1)*(t2-t\_last1)/(t2-t1)+yj-y2+(y(j+1)-yj)*(t\_last1+dt1-tj)/(t(j+1)-tj) \quad (4)$$

In the case of t_last1<tJ<t_last1+dt1, the difference (dx, dy) is calculated according to the following equations.

$$dx=(xJ-x(J-1))*(tJ-t\_last1)/(tJ-t(J-1))$$

$$dy=(yJ-y(J-1))*(tJ-t\_last1)/(tJ-t(J-1)) \quad (5)$$

In the case of t_last1>tJ, the difference (dx, dy) is calculated according to the following equations.

$$dx=0$$

$$dy=0 \quad (6)$$

Although these equations (3), (4), (5) and (6) are an example of linear interpolation, a more complex interpolation method can also be used when a difference (dx, dy) is obtained from plot information string data.

After the difference (dx, dy) is obtained, the plot information generating unit #1 multiplies coordinates dx and dy by parameters x_scale1 and y_scale1, respectively, and assigns the results to coordinates dx and dy, respectively (step S44). Then, the plot information generating unit #1 judges the value of the difference calculation flag bDiff1 (step S45).

If the value of the flag bDiff1 is true, the plot information generating unit #1 adds the difference (dx, dy) to inputted plot coordinates (x, y) and assigns the result to the coordinates (x, y) (step S46). If the value of the flag bDiff1 is false, the plot information generating unit #1 assigns the difference (dx, dy) to the coordinates (x, y) with no addition (step S47). In this case, the inputted plot coordinates (x, y) are cancelled and new coordinates (x, y) are generated.

Then, the plot information generating unit #1 updates the internal time by assigning t_last1=t_last1+dt1 (step S48) and judges whether there is a lower-order plot information generating unit 23 (step S49). If there is no lower-order plot information generating unit 23, the plot information generating unit #1 outputs the plot coordinates (x, y) as a result of one update process.

Figure 12:
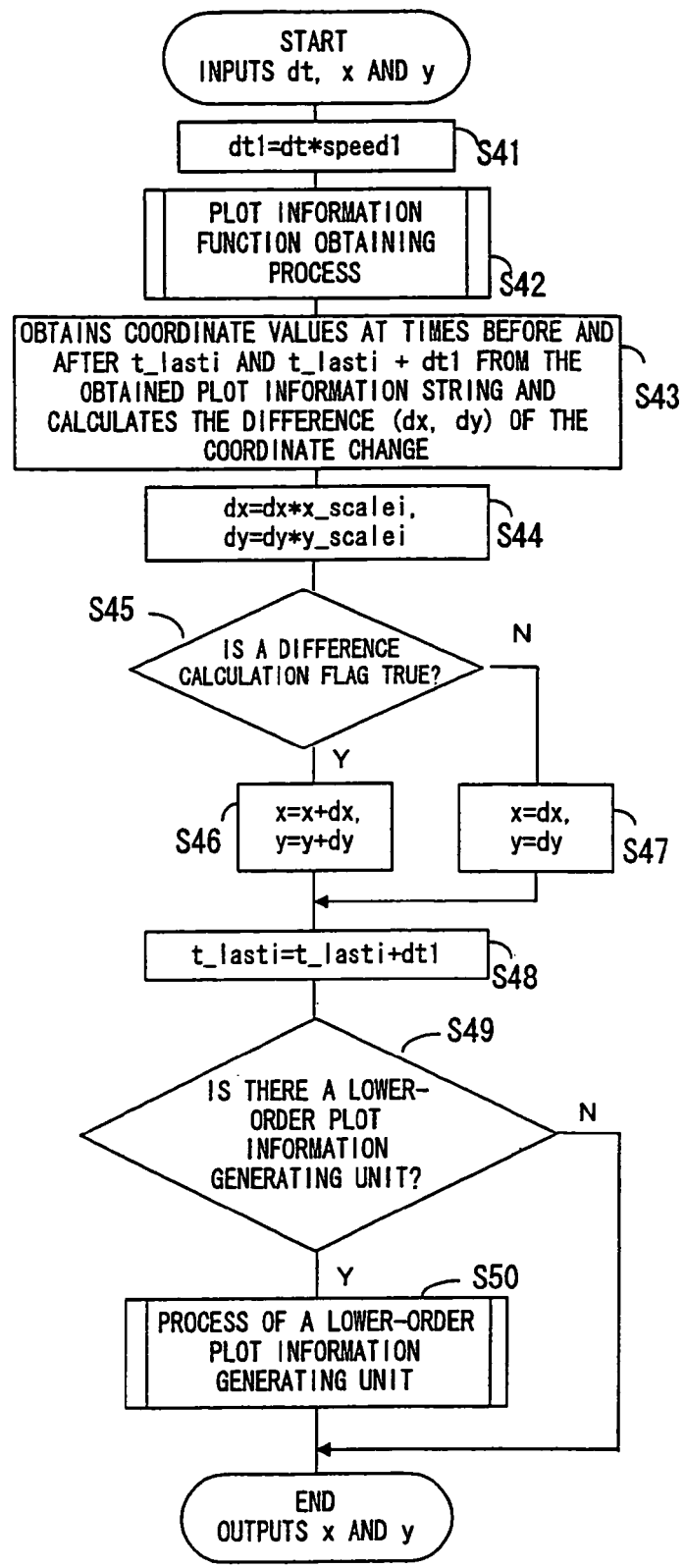
FIG. 12 is a flowchart showing the second plot information generating process.

If there is a lower-order information generating unit 23, the plot information generating unit #1 calls up the lower-order information generating unit 23, provides the lower-order information generating unit 23 with both the update interval dt and obtained plot coordinates (x, y) as inputs and makes the lower-order information generating unit 23 execute the same plot information generating process (step S50). In this case, the plot information generating process shown in FIG. 12 is recurrently called up and the process of the plot information generating unit #i is executed.

In this case, the plot information generating unit #i calculates dt1=dt*speedi in step S41, obtains a plot information string corresponding to the identifier IDk in step S42 and calculates the coordinate change difference (dx, dy) between t_lasti and t_lasti+dt1 based on the plot information string.

The plot information generating unit #i also calculates x=x*x_scalei and y=y*y_scalei in step S44, also judges the value of the difference calculation flag bDiffi in step S45, also calculates t_lasti=t_lasti+dt1 in step S48 and judges whether there is a pointer 1pi in step S49.

If in step S49 there is a lower-order plot information generating unit 23, the plot information generating unit #i calls up the lower-order plot information generating unit 23. If there is no lower-order plot information generating unit 23, the plot information generating unit #i outputs the plot coordinates (x, y) to the original higher-order plot information generating unit 23 and terminates the process.

On receipt of the plot coordinates from the lower-order plot information generating unit 23, the higher-order plot information generating unit 23 sequentially passes the plot coordinates to another higher-order plot information generating unit 23. The highest-order plot information generating unit #1 outputs the received plot coordinates as a result of one update process. By such a plot information generating process, the plot information generating unit 23 can generate plot information using a plot information string instead of a plot information function.

FIG. 14 is a flowchart showing the plot information string obtaining process in step S42 shown in FIG. 12. When the plot information generating unit #i passes the identifier IDk to the plot information string management unit 31, the plot information string management unit 31 executes a loop a process. Loop a is repeated K times corresponding to the number of the plot information strings 32.

In loop a, the plot information string management unit 31 compares the inputted identifier IDk with the identifier of one plot information string 32 (step S51). If the identifiers match, the plot information string management unit 31 outputs a plot information string 32 corresponding to the identifier IDk (step S52), and terminates the process. If the identifiers do not match, the plot information string management unit 31 repeats the process of comparing the identifier IDk with the identifier of a subsequent plot information string 32.

According to the dynamic image composition apparatus shown in FIGS. 6 and 11, each plot information generating unit 23 can cancel plot information passed from a higher-order plot information generating unit 23 and can generate a new piece of plot information. Therefore, for example, the movement of an image can also be stopped at a specific predetermined time.

Generally, if each plot information generating unit 23 generates absolute plot information using the plot information from a higher-order plot information generating unit 23 as an input, plot information outputted from the image management unit 11 is affected by the operation order of the plot information generating unit 23.

For example, a case is considered where the image management unit 11 includes two plot information generating units #1 and #2, the plot information generating unit #1 generates the plot information about a vertical vibration on a screen and the plot information generating unit #2 generates plot information which moves rightward between time 0 and time t' and stops at time t1.

In this case, the plot information generating units #1 and #2 are operated in that order. Lastly, plot information of an image which moves rightward while vertically vibrating between times 0 and t1 and stops thereat and after time t1, is outputted. If the plot information generating units #2 and #1 are operated in that order, lastly, plot information of an image which moves rightward while vertically vibrating between times 0 and t1 and it vertically vibrates there at and after time t1, is outputted. Therefore, the composition movement differs depending on the operation order of the plot information generating units #1 and #2.

Figure 15:
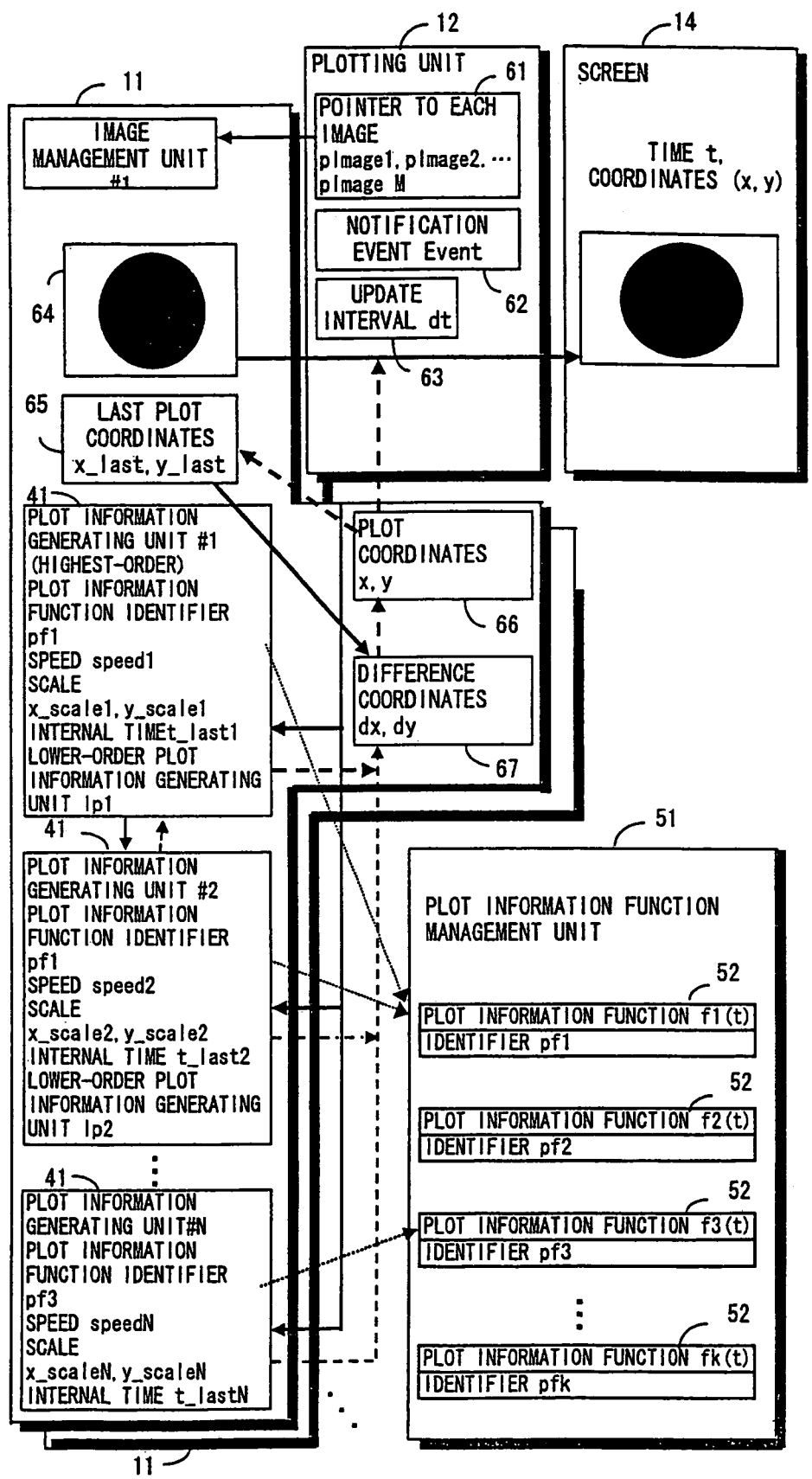
FIG. 15 shows the third dynamic image composition.

FIG. 15 shows the dynamic image composition process in the case where a plot information function 52 is used instead of a plot information string 32 in the configuration shown in FIG. 5. The pointer list 61, event variable 62 and update interval 63 of the plotting unit 12; the image data 64, last plot coordinates 65 and plot coordinates 66 of the image management unit 11; information stored in the plot information generating units 41; and the plot information function management 51 which are all shown in FIG. 15 are the same as those shown in FIG. 6.

Each image management unit 11 also stores difference coordinates 67 and further stores one or more plot information generating units 41 in the form of a list.

Figure 16:
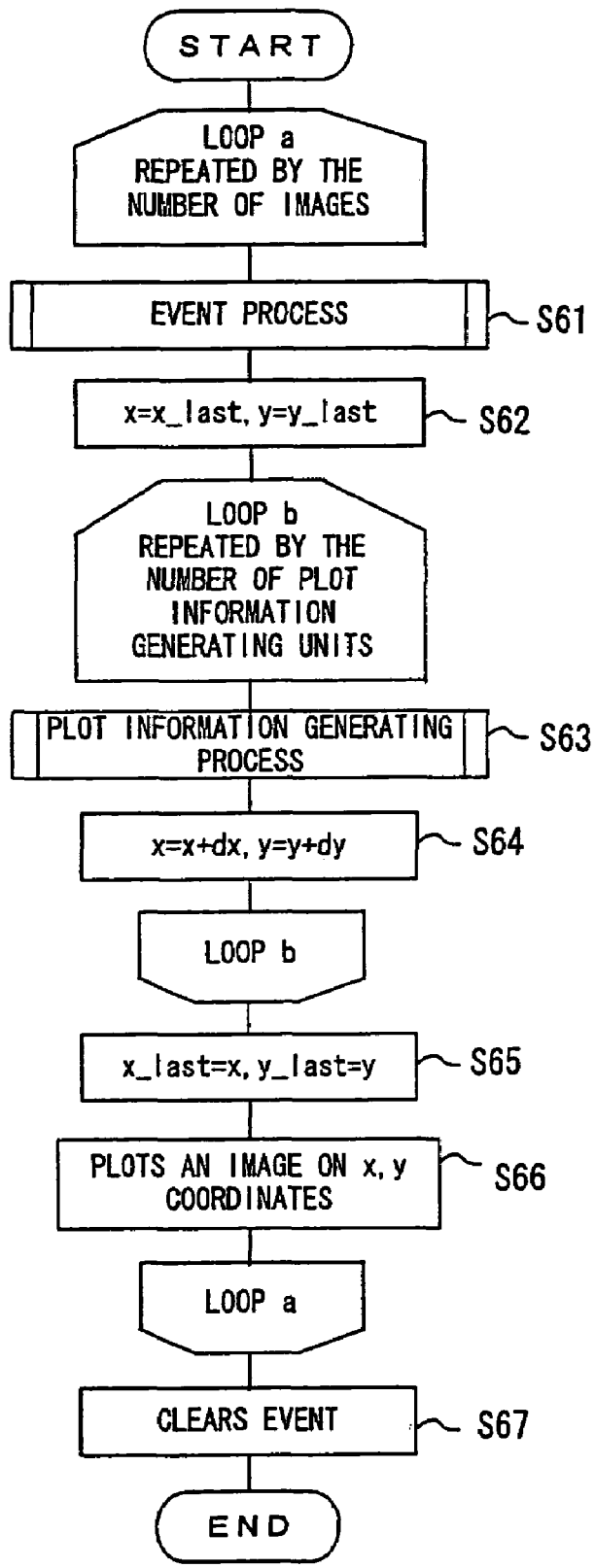
FIG. 16 is a flowchart showing the second plot update process.

FIG. 16 is a flowchart showing the plot update process of the dynamic image composition apparatus shown in FIG. 15. By one plot update process, M pieces of image data of the image management units #1-#M are sequentially plotted on coordinates generated by the plot information generating units #1-#N. A loop a corresponds to a process of calling up each image management unit 11 and is repeated M times. A loop b corresponds to a process of calling up each plot information generating unit 41 and is repeated N times.

In loop a, the image management unit 11 executes the event process shown in FIG. 8 (step S61), assigns the last plot coordinates (x_last, y_last) at a previous time to plot coordinates (x, y) (step S62) and executes the process of loop b.

In loop b, the plot information generating unit 41 is called up, and coordinate change difference (dx, dy) during an update interval dt is calculated (step S63). The details of this plot information generating process are described later. Then, the obtained difference (dx, dy) is added to the plot coordinates (x, y), and the result is assigned to the plot coordinates (x, y) (step S64).

As for loop b, lower-order plot information generating units #(i+1) can be sequentially called up tracing a pointer Ipi from the highest-order plot information generating unit #1 or the plot information generating units #1-#N can be operated in parallel.

After the loop b processes of all plot information generating units 41 are completed, the image management unit 11 assigns the obtained coordinates (x, y) to coordinates (x_last, y_last) (step S65), and the plotting unit 12 plots the image data 64 at the position of the plot coordinates (x, y) (step S66).

After the loop a processes of all image management units 11 are completed, the plotting unit 12 clears the variable Event to receive a new event notice (step S67) and terminates the process.

Figure 17:
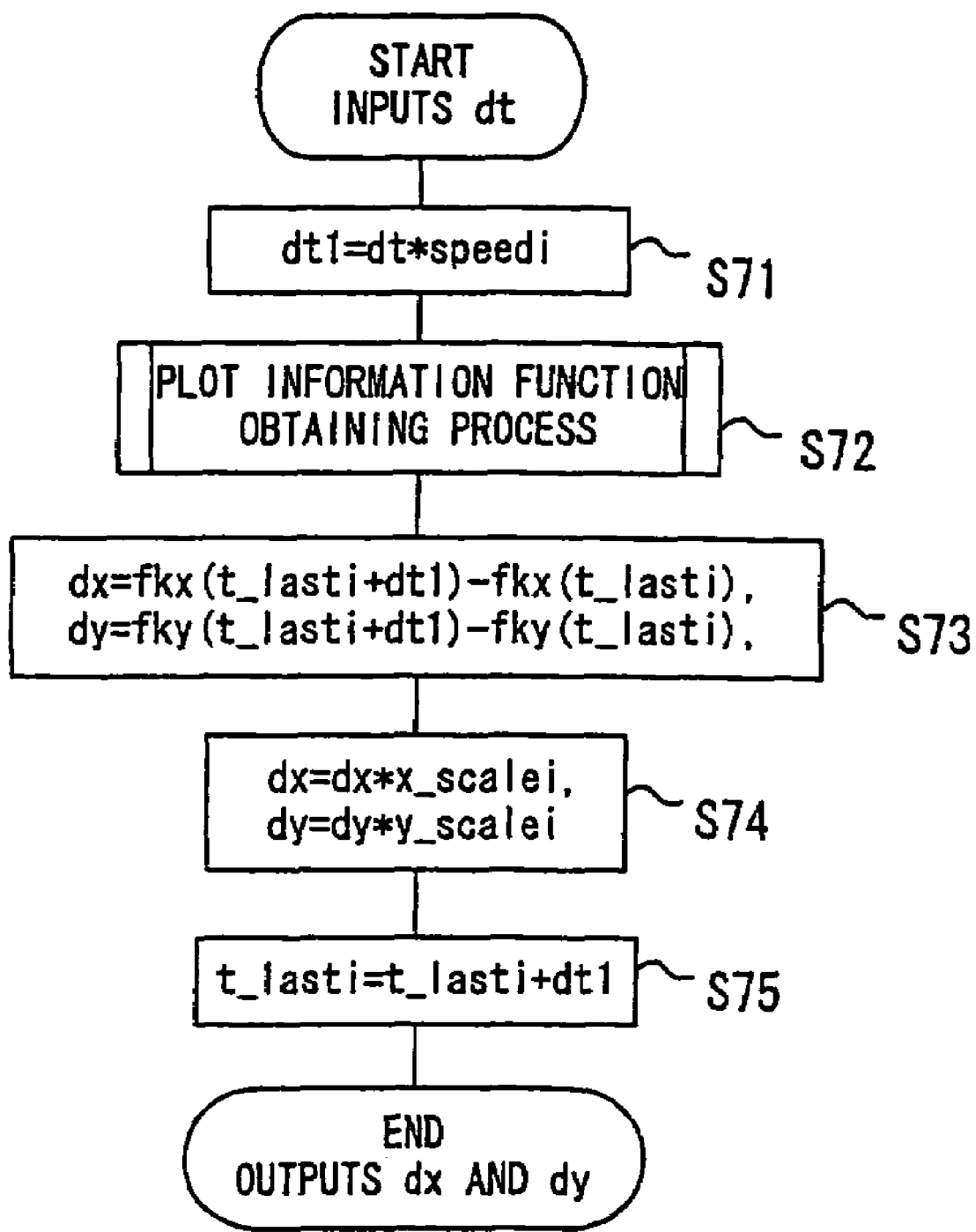
FIG. 17 is a flowchart showing the third plot information generating process.

FIG. 17 is a flowchart showing the plot information generating process in step S63 shown in FIG. 16. The plot information generating unit #i executes a process using an update interval dt as an input and outputs a plot coordinate difference (dx, dy).

The plot information generating unit #i first multiplies the update interval dt by a parameter speedi and converts the update interval dt to an internal update interval dt1 (step S71). Then, the plot information generating unit #i obtains a plot information function fk(t) corresponding to a plot information function identifier pfk from the plot information function management unit 51 by executing the plot information function obtaining process shown in FIG. 10 (step S72). Here, it is assumed that fk(t) is expressed by the following equation.

$$fk(t)=(fkx(t), fky(t)) \quad (7)$$

The plot information generating unit #i calculates the difference (dx, dy) according to the following equation using both an internal time t_last1 calculated at a previous time and the internal update interval dt1 (step S73).

$$dx=fkx(t\_lasti+dt1)-fkx(t\_lasti)$$

$$dy=fky(t\_lasti+dt1)-fky(t\_lasti) \quad (8)$$

Equation (8) indicates the respective differences of functions fkx(t) and fky(t) between internal times t_lasti and t_lasti+dt1.

Then, the plot information generating unit #i multiplies the obtained differences (dx, dy) by parameters x_scalei and y_scalei, respectively, and the results are assigned to the differences dx and dy, respectively (step S74). Then, the plot information generating unit #i updates the internal time by assigning t_lasti=t_lasti+dt1 (step S75), outputs the difference (dx, dy) and terminates the process.

The difference (dx, dy) outputted by each plot information generating unit #i is added to the plot coordinates (x, y) in step S64 shown in FIG. 16 and lastly the plot coordinates (x, y) are updated by the sum of differences (dx, dy) outputted by all plot information generating units 41.

By such a plot information generating process, a plurality of pieces of plot information generated by a plurality of plot information generating units 41 can be combined in real time when an image is updated and they can be provided to the plotting unit 12. Therefore, the complex movement of an image can be easily generated by automatically repeating the update of the image.

Figure 18:
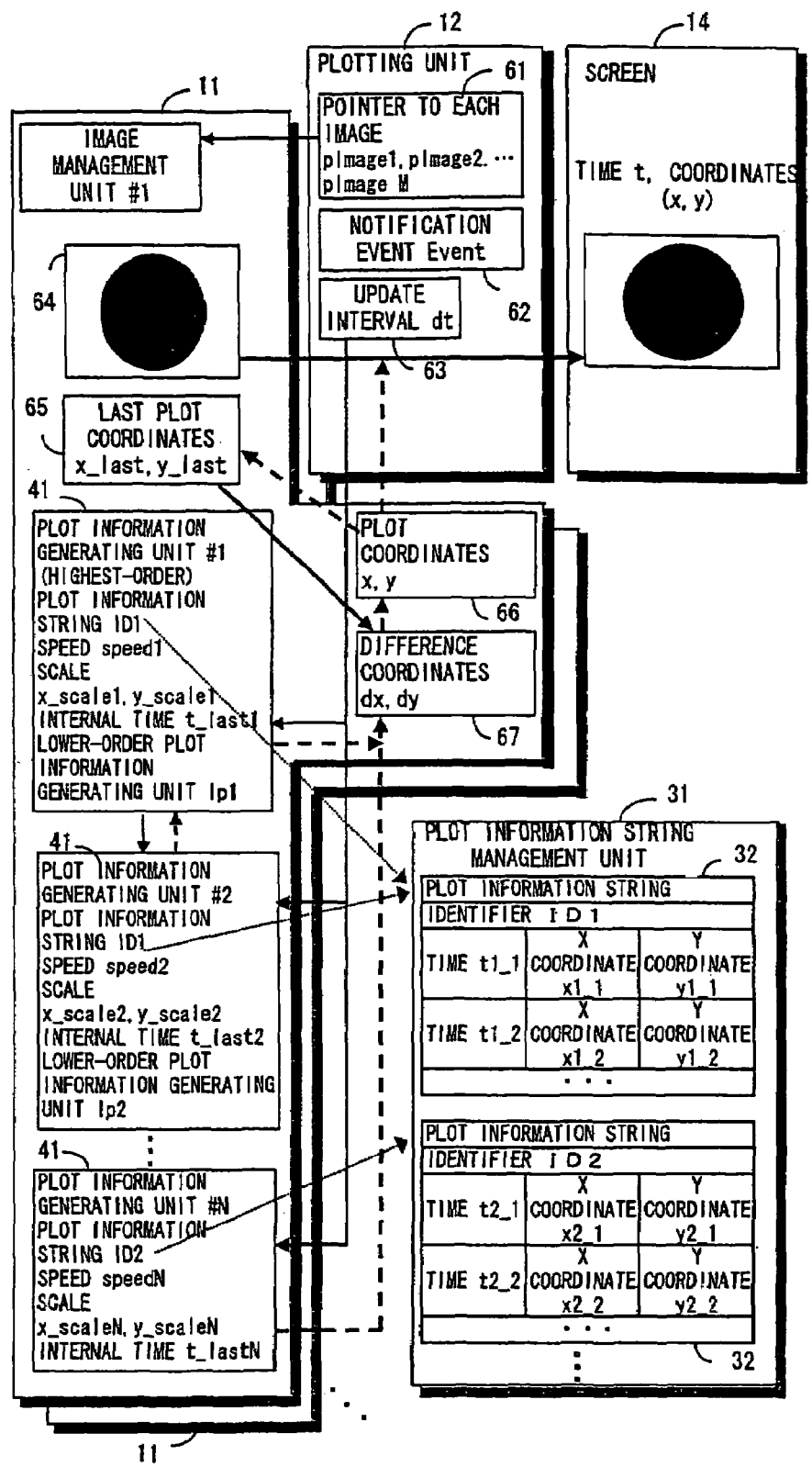
FIG. 18 shows the fourth dynamic image composition.

FIG. 18 shows the dynamic image composition process in the case of the configuration shown in FIG. 5. The pointer list 61, event variable 62 and update interval 63 of the plotting unit 12; and the image data 64, last plot coordinates 65, plot coordinates 66 and difference coordinates 67 of the image management unit 11 shown in FIG. 18 are the same as those shown in FIG. 15. Both pieces of information stored in the plot information generating unit 41 and the plot information string management unit 31 are the same as those shown in FIG. 11. However, the plot information generating unit 41 does not store a difference calculation flag.

The plot update process of the dynamic image composition apparatus shown in FIG. 18 is basically the same as that shown in FIG. 16. However, in step S63 shown in FIG. 16, the plot information generating unit 41 executes the plot information generating process shown in FIG. 19 using an update interval dt as an input and outputs plot coordinate difference (dx, dy).

The plot information generating unit #i first multiplies the update interval dt by a parameter speedi, converts the update interval dt to an internal update interval dt1 (step S81) and obtains a plot information string corresponding to a plot information identifier IDk from the plot information string management unit 31 by executing the plot information string obtaining process shown in FIG. 14 (step S82).

Then, the plot information generating unit #i obtains coordinate values at times before and after t_lasti and t_lasti+dt1 from the plot information string and calculates the coordinate change difference (dx, dy) between t_lasti and t_lasti+dt1 by performing interpolation using these coordinate values (step S83).

Then, the plot information generating unit #i multiplies the obtained differences dx and dy by parameters x_scalei and y_scalei, respectively, and assigns the results to the differences dx and dy (step S84). Then, the plot information generating unit #i updates an internal time by assigning t_lasti=t_lasti+dt1 (step S85), outputs a difference (dx, dy) and terminates the process. By such a plot information generating process, the plot information generating unit 41 can generate plot information using a plot information string instead of a plot information function.

Although in the preferred embodiments described above, the pointer 61 to the image management unit 11, plot information generating units 23 and 41, plot information function 52 and plot information string 32 are stored in the form of a list, these can be stored in an arbitrary form only if it is a structure where an element can be added/deleted.

Next, the specific example of dynamic image composition is described with reference to FIGS. 20 through 23.

Figure 20:
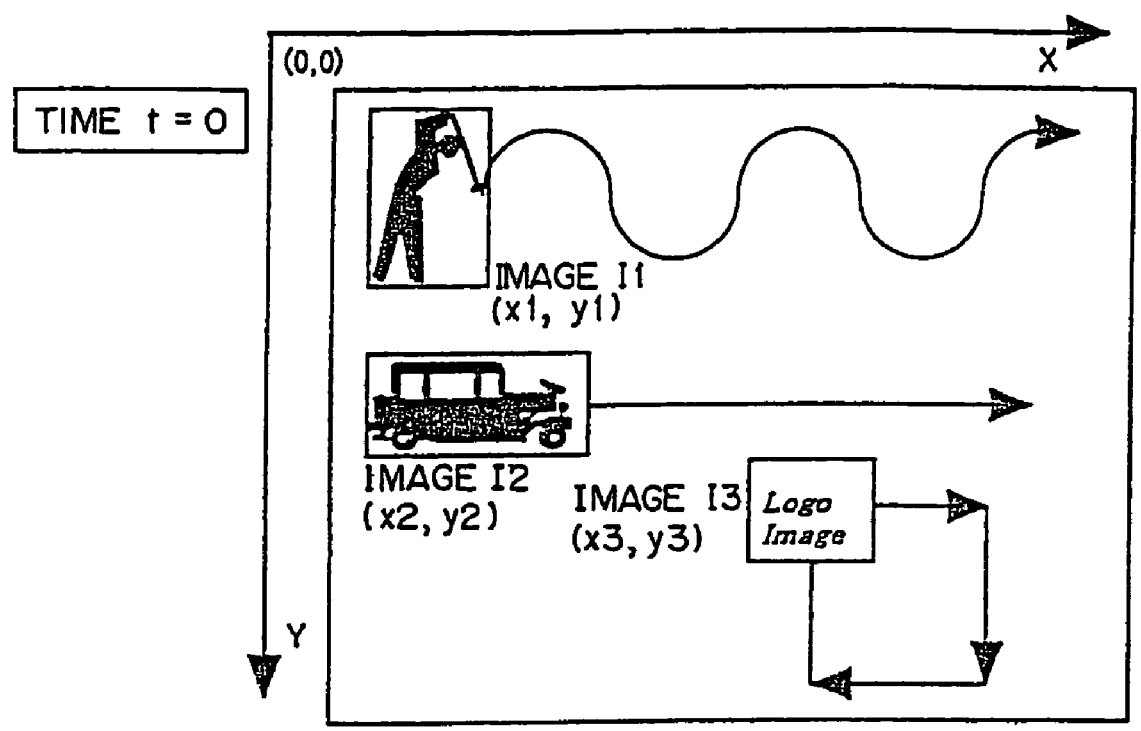
FIG. 20 shows the first dynamic image.

FIG. 20 shows a screen structure at time t=0. On this screen, an xy coordinate system having the upper left corner as an origin is established and three images I1, I2 and I3 are plotted in a state where a plot position (x, y) is changed as time elapses.

Figure 21:
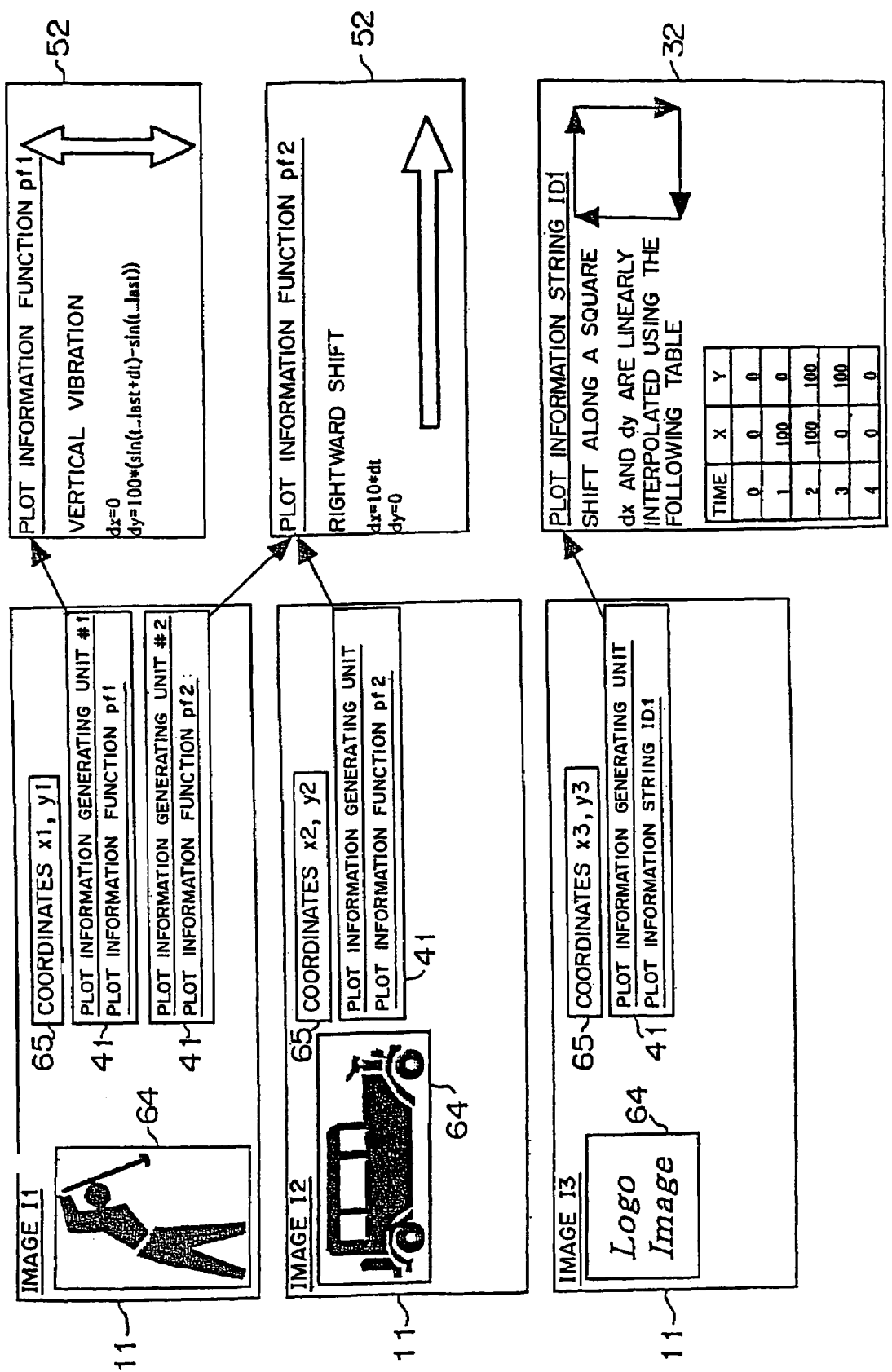
FIG. 21 shows the fifth dynamic image composition.

FIG. 21 shows the dynamic image composition process by image management units 11 for managing these images. In this example, the dynamic image composition apparatus shown in FIG. 5 is used and both a plot information function 52 and a plot information string 32 are used.

The image management unit 11 of image I1 stores image data 64, the most recent plot coordinates (x1, y1) and two plot information generating units #1 and #2, the image management unit 11 of image I2 stores image data 64, the most recent plot coordinates (x2, y2) and one plot information generating unit 41, and the image management unit 11 of image I3 stores image data 64, the most recent plot coordinates (x3, y3) and one plot information generating unit 41.

The plot information generating unit #1 of image I1 stores a plot information function identifier pf1, and the plot information generating unit #2 stores a plot information function identifier pf2. The plot information generating unit 41 of image I2 stores a plot information function identifier pf2, and the plot information generating unit 41 of image I3 stores a plot information string identifier ID1.

Each plot information generating unit 41 calculates a position coordinate difference (dx, dy) using an update interval dt to be inputted and a stored last update time t_lasti and using a designated plot information function 52 or plot information string 32. In this example, the difference (dx, dy) is directly provided by each plot information function 52 and it is defined as follows.

Plot Information Function pf1

$$dx=0$$

$$dy=100*(\sin(t\_last+dt)-\sin(t\_last)) \quad (9)$$

According to this function, an x-direction difference dx is 0 and a y-direction difference dy is equal to 100 times the difference of sin(t) between times t_last and t_last+dt. As a result, this function indicates a vertical vibration with an amplitude of 100.

Plot Information Function pf2

$$dx=10*dt$$
$$dy=0 \tag{10}$$

According to this function, an x-direction difference dx is equal to ten times the update interval dt and a y-direction difference is 0. As a result, this function indicates a linear shift which is made by 10 shifts per unit time in the x-direction (rightward).

The plot information string 32 includes position coordinates for the four vertices of a square with each side of 100, and a locus designated by the plot information string 32 indicates a clockwise shift along the four sides of the square with an upper left vertex as a start point. In this case, the difference (dx, dy) is calculated based on the designated locus by performing a linear interpolation.

Each image management unit 11 calculates position coordinates (x, y) as follows using the difference (dx, dy) calculated by these plot information functions 52 or plot information strings 32.

Image Management Unit 11 of Image I1

The plot information generating unit #1 calculates the difference of a vertical vibration using a plot information function pf1 and the plot information generating unit #2 calculates the difference of a rightward shift using a plot information function pf2. The sum of these two differences becomes the change amount of position coordinates in one update. As a result, image I1 moves along the locus of a sine wave.

Image Management Unit 11 of Image I2

The plot information generating unit 41 calculates the difference of a rightward shift using a plot information function pf2 and the difference becomes the change amount of position coordinates in one update. As a result, image I2 linearly moves rightward.

Image Management Unit 11 of Image I3

The plot information generating unit 41 calculates the difference of a shift along a square using a plot information string ID1, and the difference becomes the change amount of position coordinates in one update. As a result, image I3 moves along a locus designated by the plot information string ID1.

Figure 22:
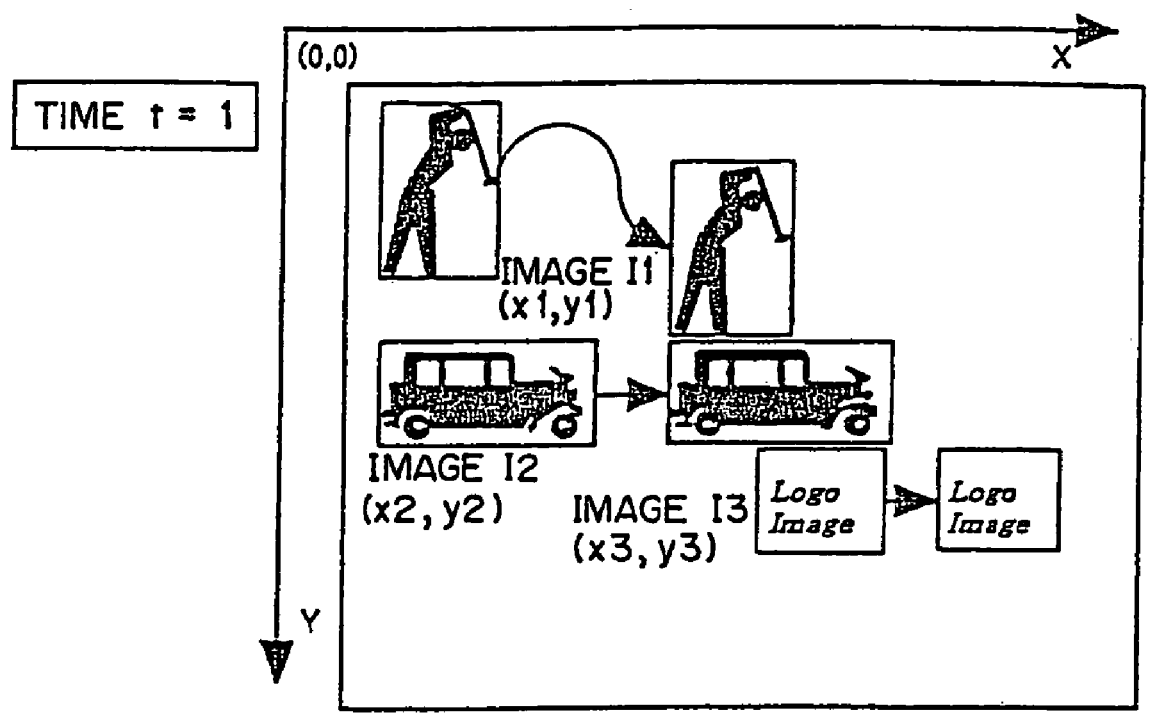
FIG. 22 shows the second dynamic image.

Here, a case is considered where in such a dynamic image composition process, notification of a specific event is posted at time t=1 and an event process is executed. In this case, at time t=0, each image is plotted in the initial position, as shown in FIG. 20. Between times t=0 and t=1, each image moves according to a difference generated by each plot information generating unit 41 and added to the position coordinates, as shown in FIG. 22. Therefore, image I1 moves along the locus of a sine wave, image I2 linearly moves rightward and image I3 moves along the locus of a square.

Then, it is assumed that at time t=1, notification of an event is posted and the plot information generating unit #1 is requested by the image management unit 11 of image I1 to be deleted. In this case, the image management unit 11 of image I1 performs an event process, and the image information generating unit #1 is deleted. Therefore, after this, the difference of a vertical vibration is not generated, and only the plot information generating unit #2 generates differences.

Figure 23:
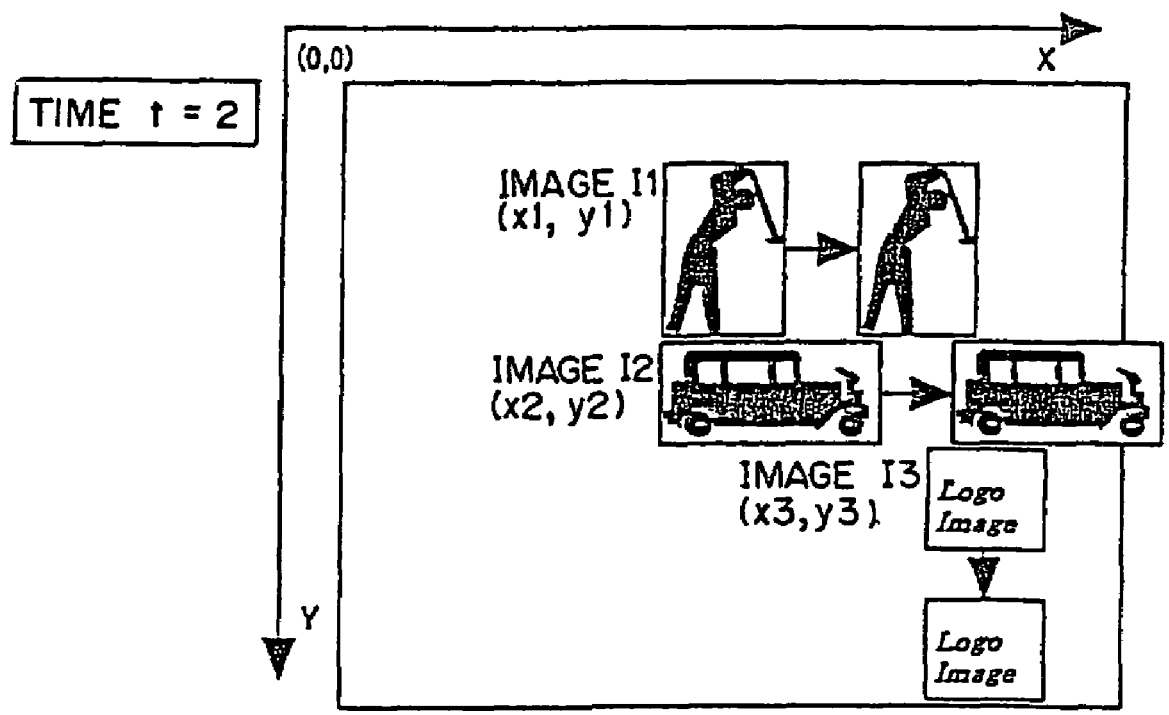
FIG. 23 shows the third dynamic image.

Then, between times t=1 and t=2, each image continues to move according to a difference generated by each plot information generating unit 41 and added to the position coordinates, as shown in FIG. 23. At this time, image I1 stops vertically vibrating, and at time t=1, it linearly moves rightward while maintaining the y coordinate value. Image I2 linearly moves rightward and image I3 moves along the locus of a square.

If the content of the event notification at time t=1 is a request to add a new plot information generating unit #3 to the image management unit 11 of image I1, the image management unit 11 adds the plot information generating unit #3. After this, differences generated by three plot information generating units #1, #2 and #3 are added and the position coordinates of image I1 is determined.

Figure 24:
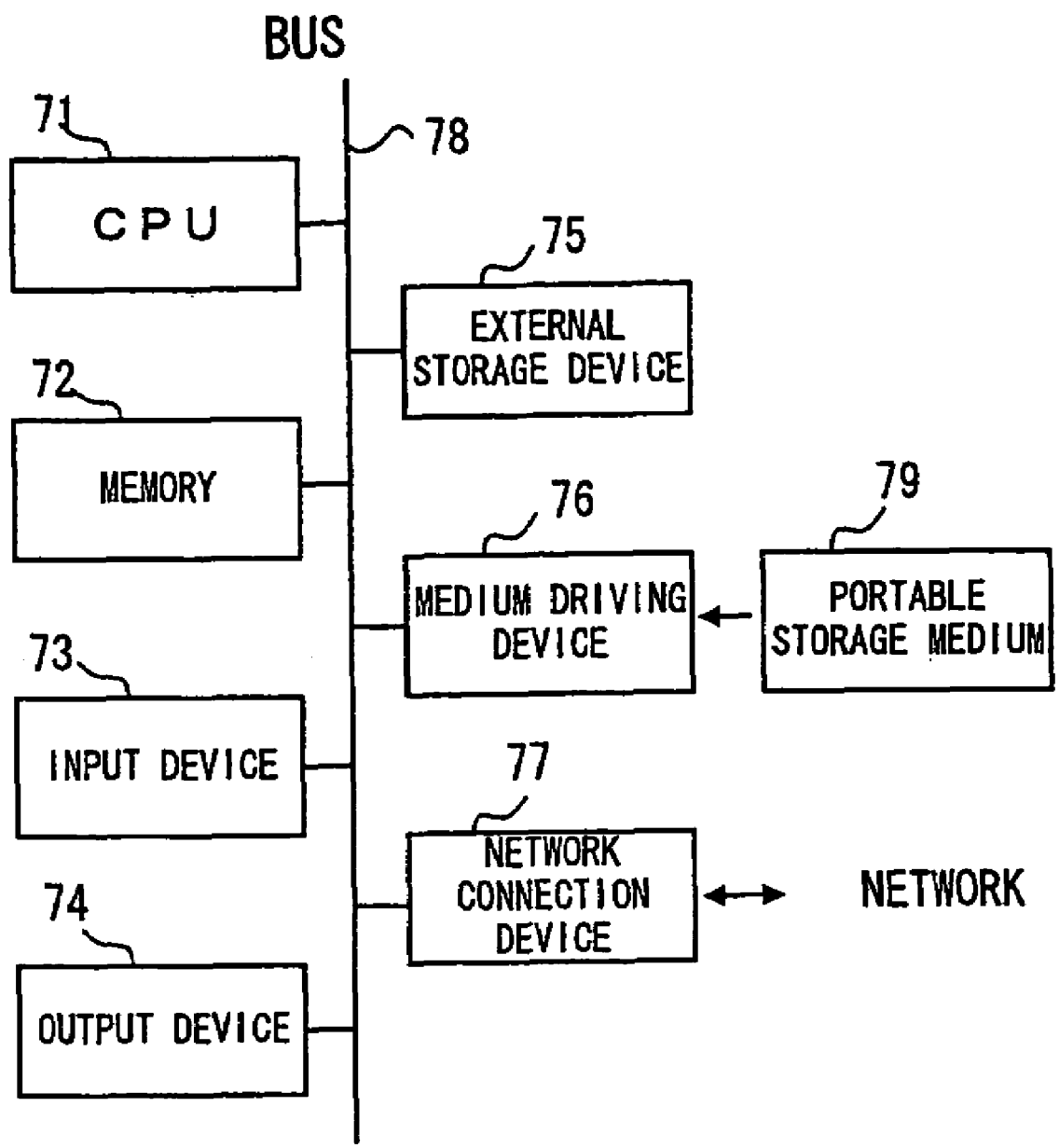
FIG. 24 shows the configuration of an information processing device.

By the way, the dynamic image composition apparatuses shown in FIGS. 6, 11, 15 and 18 can be configured using an information processing device (computer) shown in FIG. 24. The information processing device shown in FIG. 24 comprises a CPU (central processing unit) 71, a memory 72, an input device 73, an output device 74, an external storage device 75, a medium driving device 76 and a network connection device 77, which are connected to one another by a bus 78.

The memory 72 includes, for example, a ROM (read only memory), RAM (random access memory), etc., and it stores a program and data used for the process. The CPU 71 performs necessary processes by using the memory 72 and executing the program.

In these examples, the image management unit 11, plotting unit 12, image information function management unit 51, image information string management unit 31, image information generating units 23 and 41, etc., correspond to software components described by the program, and each component is stored in the specific program code segment of the memory 72. The list of pointers 61, event variable 62, update interval 63, image data 64, last plot coordinates 65, other plot coordinates 66, etc., are also stored in the memory 72.

The input device 73 includes, for example, a keyboard, a pointing device, touch panel, etc., and it is used to input a user's instruction and information. Notification of an input operation to the input device 73 is also sometimes made to the plotting unit 12 as an event. The output device 74 includes, for example, the VRAM 13 and display 14 shown in FIG. 5, and it is used to output both inquiries to a user and composed dynamic images.

The external storage device 75 includes, for example, a magnetic disk device, optical disk device, magneto-optical disk device, etc. This external storage device 75 can also store the program and data described above, and the program and data can be used by being loaded into the memory 72, if required. The external storage device 75 can also be used as a database for storing the image data 64, plot information function 52, plot information string 32, etc.

The medium driving device 76 drives a portable storage medium 79 and accesses the recorded content. For the portable storage medium, an arbitrary computer readable storage medium, such as a memory card, floppy disk, CD-ROM (compact disk read only memory), optical disk, magneto-optical disk, etc., is used. The program and data described above can also be stored in this portable storage medium 79, and can also be used by being loaded into the memory 72, if required.

The network connection device 77 communicates with external devices via an arbitrary network (line), such as a LAN (local area network), etc., and transmits/receives data accompanying the communications. The connection network device can also receive the program and data from an external device and the program and data can be used by being loaded into the memory 72, if required.

Figure 25:
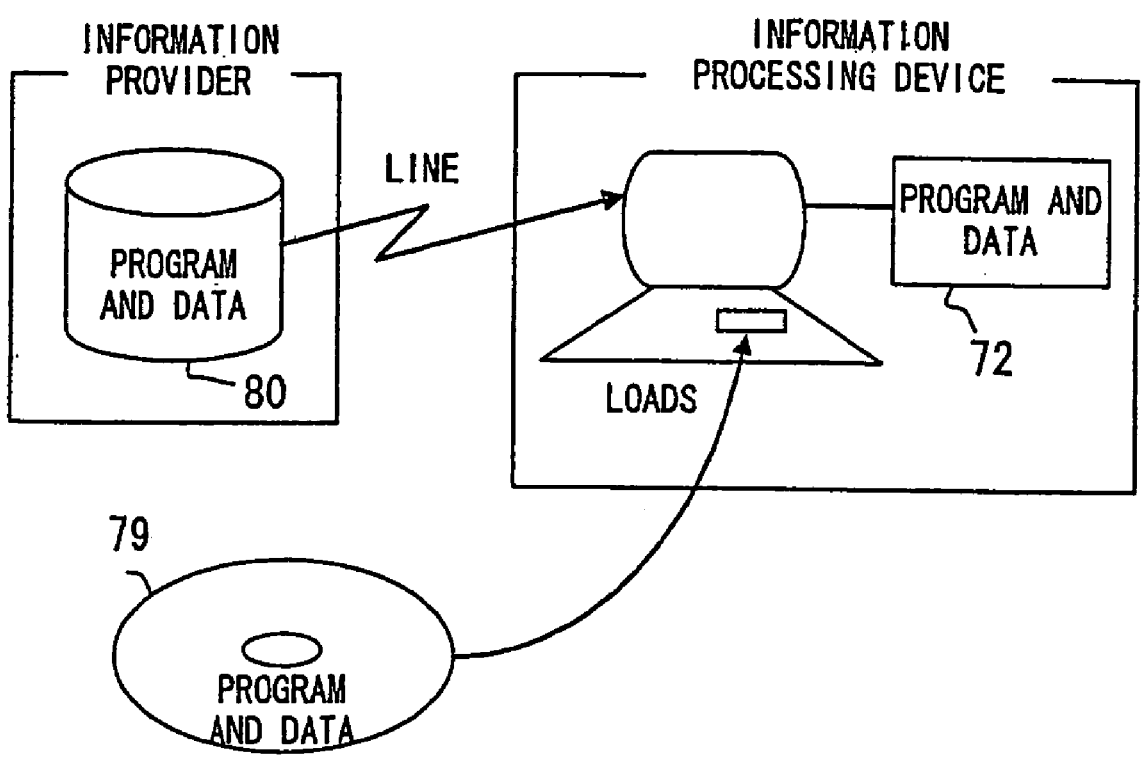
FIG. 25 shows an example of storage media.

FIG. 25 shows examples of computer readable storage media which can provide the information processing device shown in FIG. 24 with the program and data. The program and data stored in the portable storage medium 79 or an external database 80 can be loaded into the memory 72. The CPU 71 executes necessary processes by using the data and running the program.

Although in the preferred embodiments described above, configurations for implementing the image management unit 11 by software have been described, the image management unit 11 can also be implemented by hardware.

FIG. 26 shows a case where a plurality of image management units 11 are configured by one hardware circuit. The image management unit shown in FIG. 26 comprises a plurality of memories 81 (#1-#M), selectors 82 and 83 for selecting a memory 81, a plurality of plot information generating circuits 84 (#1-#N), selectors 85 and 86 for selecting a plot information generating circuit 84 and a control circuit 87.

The control circuit 87 switches between the selectors 82 and 83 by a control signal C1, switches between the selectors 85 and 86 by a control signal C2 and controls the plot information generating circuits 84 by a control signal C3. In this example, it is assumed for simplification purposes that only coordinates (x, y) are handled as plot information.

The memories #1-#M correspond to the image management units #1-#M, respectively, described above and they store plot information obtained at a previous time at time t. The plot information generating circuits #1-#N correspond to the plot information generating units #1-#N, respectively, and are described above and perform a calculation corresponding to one movement element and output the plot information. If the time t, an update interval dt and plot coordinates (x, y) at the previous time are used as input, outputted plot coordinates (x', y') are expressed as follows.

$x'=fx(t, dt, x, y)$ $y'=fy(t, dt, x, y)$ (11)

Above, dt corresponds to the difference between the previous time and the present time t, and fx(t, dt, x, y) and fy(t, dt, x, y) correspond to functions to generate an image movement. For example, if a vertical vibration is generated using sin(t), the following equations hold true.

$fx(t, dt, x, y)=x$ $fy(t, dt, x, y)=y+\sin(t)-\sin(t-dt)$ (12)

These functions can also output the history of past plot coordinates. For example, input coordinates (x_t1, y_t1) at time t1 can be stored, and a function to continue to output the coordinates (x_t1, y_t1) after time t1 can be defined.

If the same plot information generating circuit 84 is used for a plurality of images, such plot coordinate data are stored in a register of the plot information generating circuit 84 for each image, and appropriate data are outputted by switching the register by a control signal C3 from the control circuit 87.

When a plot update process is started at time t, first the selectors 82 and 83 are switched over by a control signal C1 from the control circuit 87 and a memory #1 is selected. Then, the selectors 85 and 86 are switched over by a control signal C2 and a plot information generating circuit #1 is selected. Simultaneously, the register of the plot information generating circuit #1 is switched by a control signal C3, if required, and appropriate data are selected. In this way, the plot coordinates of the memory #1 are inputted to the plot information generating circuit #1, and the output from the plot information generating circuit #1 is stored in the memory #1.

Then, the selectors 85 and 86 are switched over, a plot information generating circuit #2 is selected and the plot information is inputted from the memory #1 to the plot information generating circuit #2. Then, plot coordinates are generated in the plot information generating circuit #2 in the same way as in the case of the plot information generating circuit #1, and the plot coordinates are stored in the memory #1. After such an operation is repeated for all plot information generating circuits 84 assigned to the image management unit #1, the output of the last plot information generating circuit #1 is outputted as the plot information at the present time of the image management unit #1. At this time, the plot information is simultaneously stored in the memory #1.

After the operation of the image management unit #1 is completed in this way, the selectors 82 and 83 are switched over, the memory #2 is selected and the operation of the image management unit #2 is performed in the same way. After such an operation is repeated for M image management units, the plot update process at time t is completed.

For example, a case is described where the image management unit #1 corresponding to the memory #1 generates a rightward shift along the locus of a sine wave and the image management unit #2 corresponding to a memory #2 generates a leftward shift along the locus of a sine wave. It is assumed that plot information generating circuits #1, #2 and #3 generate the following respective movements.

Plot information generating circuit #1: Vertical vibration of sin(t)

Plot information generating circuit #2: Rightward linear shift

Plot information generating circuit #3: Leftward linear shift

In this case, the circuit shown in FIG. 26 first selects a memory #1 using the selectors 82 and 83, and it selects a plot information generating circuit #1 using the selectors 85 and 86. In this way, the vertical vibration of sin(t) is added to the coordinates of the memory #1. Then, the circuit selects a plot information generating circuit #2 using the selectors 85 and 86. In this way, a rightward shift is added to the plot coordinates of a memory #1, and, as a result, plot coordinates in the case where the plot coordinates move rightward along the locus of a sine wave are outputted.

Then, the circuit selects a memory #2 using the selectors 82 and 83 and it selects the plot information generating circuit #1 using the selectors 85 and 86. In this way, the vertical vibration of sin(t) is added to the plot coordinates of the memory #2. Then, the circuit selects a plot information generating circuit #3 using the selectors 85 and 86. In this way, a leftward shift is added to the coordinates of the memory #2, and, as a result, plot coordinates in the case where the plot coordinates move leftward along the locus of a sine wave are outputted.

In this way, by switching both the memories 81 and plot information generating circuits 84 using selectors, the outputs of a plurality of plot information generating circuits 84 can be combined and one image movement can be generated. One plot information generating circuit 84 can also be used to generate a plurality of image movements.

As described above, the present invention is applicable to an arbitrary field, software or hardware, where a dynamic image moves as time elapses or according to an event. The following are potential software applications.

(1) Dynamic image generation software (2) Home page generation software and browser software (3) CD-ROM content generation software and reproduction software (4) Presentation generation software and reproduction software (5) Game generation software and game software For example, in a conventional multimedia title generation/reproduction system used for home page generation, etc., only one movement can be given to one image element. Therefore, if a vertical vibration with a rightward shift is given, the combined result of the two movements must be anticipated and prepared in advance.

However, according to the system of the present invention, a vertical vibration with a rightward shift can be composed by separately generating a rightward shift and a vertical shift and by linking both to one image component when an image is reproduced. If this system is adopted, a movement can be dynamically added/deleted according to a user's instruction or time.

According to this system, since a rightward shift and a vertical vibration are separately managed when an image is reproduced, a movement in which the image starts moving rightward while vertically vibrating when the image which is moving rightward is clicked, and in which the image stops vertically vibrating when the image is clicked again, can be easily generated. In this case, the system can be configured in such a way that first a rightward shift is linked to an image component as a fundamental movement and a vertical vibration is added/deleted by a click event. According to the conventional system, a rightward shift and a rightward shift with a vertical vibration are separately configured and they are switched over by a click. However, if the two movements are prepared without concern to the continuity, there is a possibility that the two movements may be discontinued when they are switched over.

If the system of the present invention is adopted, a multimedia title producer can handle each movement as a component. Since each kind of movement element is recorded in the completed multimedia title in a disassembled state, another producer can extract his/her favorite movement element from the multimedia title and can use the element as a movement component.

For example, it can be considered that a multimedia title including an image which moves along a specific path while vertically vibrating in a specific frequency includes two movement components, that is, a vertical vibration with a frequency and a shift along a path. In this case, the vertical vibration with a frequency can be implemented even in another multimedia title by extracting and using only the vertical vibration with the frequency. However, according to the conventional system, since a movement is composed in advance when the multimedia title is produced, it is very difficult to extract only the vertical vibration with a frequency.

Although in the preferred embodiments described above, for a plot information function, the vertical vibration of a sine wave and a leftward/rightward linear shift are used, another arbitrary function can also be used. For example, the vibration of a cosine wave, a shift along a straight line y=ax+b, a shift along a parabola, a shift along a circle/ellipse and the like can also be defined as a function. A plot information string is not limited to the locus of a square, and the locus of an arbitrary shape, such as a parabola, circle, ellipse, etc., can also be used for a plot information string.

Furthermore, plot information generated by a plot information generating unit is not limited to the plot position of an image and it can also be the enlargement/reduction ratio, rotation angle, color, sequential relationship, etc., of an image component. A more complex dynamic image can be displayed by dynamically combining these pieces of information.

According to the present invention, when a plurality of dynamic images are displayed on a screen, a complex movement can be easily generated by combining a plurality of movement elements. For example, a movement can be added/deleted in real time according to an event, a movement can be stopped or one movement element can be applied to a plurality of images.

What is claimed is:

1. A dynamic image composition apparatus for combining and plotting one or more images, comprising:

an image management device provided for each image, for including a plurality of plot information generating devices for generating a difference of plot information used to plot a dynamic image on a screen between a previous time and a present time, the plot information being one of a plot position and a rotation angle of the dynamic image on the screen to update the dynamic image correspondingly to a movement element for generating a movement of the dynamic image, and device for generating plot information at the present time using a sum of differences generated by the plurality of the plot information generating devices; and plotting device for receiving the plot information at the present time from the image management device and plotting a corresponding image based on the plot information at the present time.

2. A computer-readable storage medium on which is recorded a program for enabling a computer to execute a process, the process comprising:

generating differences of a plurality of pieces of plot information used to plot an image on a screen between a previous time and a present time, for each image, the plot information being one of a plot position and a rotation angle of the image on the screen to update the image correspondingly to a movement element for generating a movement of the image;

generating plot information at the present time of each image using a sum of the differences of the plurality of the pieces of the plot information; and plotting each image based on the plot information at the present time.

3. A dynamic image composition apparatus for combining and plotting one or more images, comprising:

image management means provided for each image, for including a plurality of plot information generating means for generating a difference of plot information used to plot a dynamic image on a screen between a previous time and a present time, the plot information being one of a plot position and a rotation angle of the dynamic image on the screen to update the dynamic image correspondingly to a movement element for generating a movement of the dynamic image, and means for generating plot information at the present time using a sum of differences generated by the plurality of the plot information generating means; and plotting means for receiving the plot information at the present time from the image management means and plotting a corresponding image based on the plot information at the present time.

* * * * *